(12) United States Patent
Tonooka et al.

(10) Patent No.: US 12,366,388 B2
(45) Date of Patent: Jul. 22, 2025

(54) MAGNETIC REFRIGERATION DEVICE AND REFRIGERATION CYCLE DEVICE

(71) Applicant: Mitsubishi Electric Corporation, Tokyo (JP)

(72) Inventors: Shun Tonooka, Tokyo (JP); Atsushi Ogasahara, Tokyo (JP); Tetsuya Matsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 442 days.

(21) Appl. No.: 17/799,277

(22) PCT Filed: Apr. 20, 2020

(86) PCT No.: PCT/JP2020/017078
§ 371 (c)(1),
(2) Date: Aug. 12, 2022

(87) PCT Pub. No.: WO2021/214836
PCT Pub. Date: Oct. 28, 2021

(65) Prior Publication Data
US 2023/0071315 A1   Mar. 9, 2023

(51) Int. Cl.
*F25B 21/00* (2006.01)
(52) U.S. Cl.
CPC ...... *F25B 21/00* (2013.01); *F25B 2321/0022* (2013.01); *F25B 2321/0023* (2013.01)
(58) Field of Classification Search
None
See application file for complete search history.

(56) References Cited

U.S. PATENT DOCUMENTS

| 6,588,215 B1 * | 7/2003 | Ghoshal | F25B 21/00 62/3.1 |
| 6,588,216 B1 * | 7/2003 | Ghoshal | H10N 10/00 62/3.1 |

(Continued)

FOREIGN PATENT DOCUMENTS

| CN | 109612150 A | 4/2019 |
| CN | 116123750 A * | 5/2023 |

(Continued)

OTHER PUBLICATIONS

JP-6136842-B2 English machine translation (Year: 2017).*

(Continued)

*Primary Examiner* — Jenna M Maroney
(74) *Attorney, Agent, or Firm* — XSENSUS LLP

(57) ABSTRACT

A magnetic refrigeration device includes a magnetocaloric material, first piping, second piping, a magnetic field generating unit, and a switching unit. The first piping supplies a refrigerant to the magnetocaloric material in a first refrigerant direction. The second piping supplies the refrigerant to the magnetocaloric material in a second refrigerant direction. The magnetic field generating unit is capable of applying a magnetic field to the magnetocaloric material. The switching unit switches between a first state and a second state in response to the magnetic field. In the first state, the refrigerant is supplied from the first piping to the magnetocaloric material. In the second state, the refrigerant is supplied from the second piping to the magnetocaloric material.

16 Claims, 17 Drawing Sheets

(56) References Cited

U.S. PATENT DOCUMENTS

| | | | | |
|---|---|---|---|---|
| 8,312,730 | B2* | 11/2012 | Kobayashi | F25B 21/00 62/118 |
| 9,857,105 | B1* | 1/2018 | Schroeder | F25B 21/00 |
| 9,964,344 | B2* | 5/2018 | Kim | F25B 21/00 |
| 2003/0051774 | A1* | 3/2003 | Saito | H01F 1/015 148/302 |
| 2008/0236172 | A1* | 10/2008 | Muller | F25B 21/00 62/3.1 |
| 2008/0314049 | A1 | 12/2008 | Shin et al. | |
| 2012/0031108 | A1 | 2/2012 | Kobayashi et al. | |
| 2013/0111925 | A1* | 5/2013 | Hsu | F25B 21/00 62/3.1 |
| 2013/0192269 | A1* | 8/2013 | Wang | F25B 21/00 62/3.1 |
| 2013/0227965 | A1* | 9/2013 | Yagi | F25B 21/00 62/3.1 |
| 2013/0247588 | A1* | 9/2013 | Mun | F25B 21/00 62/3.1 |
| 2013/0327062 | A1 | 12/2013 | Watanabe et al. | |
| 2014/0311165 | A1* | 10/2014 | Watanabe | B60H 1/32 62/3.1 |
| 2015/0033763 | A1* | 2/2015 | Saito | F25B 21/00 62/3.1 |
| 2015/0168030 | A1 | 6/2015 | Leonard et al. | |
| 2015/0260433 | A1* | 9/2015 | Choi | F25B 21/00 62/3.1 |
| 2015/0267943 | A1* | 9/2015 | Kim | F25B 21/00 62/3.1 |
| 2016/0025385 | A1* | 1/2016 | Auringer | F25B 21/00 62/3.1 |
| 2016/0076797 | A1* | 3/2016 | Boeder | F25B 21/00 62/3.1 |
| 2016/0091227 | A1* | 3/2016 | Leonard | F25B 21/00 62/3.1 |
| 2016/0238287 | A1* | 8/2016 | Benedict | F25B 21/00 |
| 2017/0130999 | A1 | 5/2017 | Numazawa | |
| 2020/0378654 | A1* | 12/2020 | Ookawa | F25B 21/00 |

FOREIGN PATENT DOCUMENTS

| | | | |
|---|---|---|---|
| JP | 2009-524796 A | | 7/2009 |
| JP | 2010-25435 A | | 2/2010 |
| JP | 2010-196914 A | | 9/2010 |
| JP | 2012-37112 A | | 2/2012 |
| JP | 2013-253725 A | | 12/2013 |
| JP | 2015078790 A | * | 4/2015 |
| JP | 2017-501364 A | | 1/2017 |
| JP | 6136842 B2 | * | 5/2017 |
| JP | 2019027610 A | * | 2/2019 |
| KR | 101675697 B1 | * | 11/2016 |
| WO | WO-2005093343 A1 | * | 10/2005 |
| WO | 2007/086638 A1 | | 8/2007 |
| WO | 2010023381 A2 | † | 3/2010 |
| WO | 2015094686 A1 | † | 6/2015 |
| WO | 2015/199139 A1 | | 12/2015 |
| WO | WO-2018232392 A1 | * | 12/2018 |
| WO | WO-2019106977 A1 | * | 6/2019 |

OTHER PUBLICATIONS

Chinese Office Action issued Jun. 26, 2023 in corresponding Chinese Patent Application No. 202080099771.4 (with English translation), 16 pages.
International Search Report and Written Opinion mailed on Jul. 14, 2020, received for PCT Application PCT/JP2020/017078, filed on Apr. 20, 2020, 12 pages including English Translation.
Extended European Search Report issued May 4, 2023, in corresponding European Patent Application 20932116.5, 7pp.
Communication pursuant to Rule 114(2) EPC, issued in corresponding European Patent Application 20932116.5, 5pp Issued May 10, 2023.

\* cited by examiner
† cited by third party

MAGNETIC REFRIGERATION DEVICE AND REFRIGERATION CYCLE DEVICE

CROSS-REFERENCE TO RELATED APPLICATION

The present application is based on PCT filing PCT/JP2020/017078, filed Apr. 20, 2020, the entire contents of which are incorporated herein by reference.

TECHNICAL FIELD

The present disclosure relates to a magnetic refrigeration device and a refrigeration cycle device.

BACKGROUND ART

A magnetic refrigeration device and a refrigeration cycle device using a magnetocaloric material have been known (see, for example, Japanese Patent Laying-Open No. 2010-25435).

CITATION LIST

Patent Literature

PTL 1: Japanese Patent Laying-Open No. 2010-25435

SUMMARY OF INVENTION

Technical Problem

The magnetic refrigeration device disclosed in Japanese Patent Laying-Open No. 2010 -25435 uses a pump to regulate a flow rate and a flow direction of a refrigerant flowing through the magnetocaloric material. On the other hand, the flow rate and the flow direction of the refrigerant need to be synchronized with the application and elimination of a magnetic field to and from the magnetocaloric material. In order to regulate the flow rate of the refrigerant, the above-described pump, a control device that controls the operation of the pump, a power source that drives the pump, and the like are required. This makes the magnetic refrigeration device larger in size and complex in structure, which brings about an increase in manufacturing cost.

It is therefore an object of the present disclosure to provide a magnetic refrigeration device and a refrigeration cycle device capable of suppressing an increase in device size, an increase in complexity, and an increase in cost.

Solution to Problem

A magnetic refrigeration device according to the present disclosure includes a magnetocaloric material, first piping, second piping, a magnetic field generating unit, and a switching unit. The first piping supplies a refrigerant to the magnetocaloric material in a first refrigerant direction. The second piping supplies the refrigerant to the magnetocaloric material in a second refrigerant direction different from the first refrigerant direction. The magnetic field generating unit is capable of applying a magnetic field to the magnetocaloric material. The switching unit switches between a first state and a second state in response to the magnetic field generated by the magnetic field generating unit. In the first state, the refrigerant is supplied from the first piping to the magnetocaloric material. In the second state, the refrigerant is supplied from the second piping to the magnetocaloric material.

A refrigeration cycle device according to the present disclosure includes the above-described magnetic refrigeration device, a first heat exchanger, and a second heat exchanger. In the magnetic refrigeration device, the first piping includes a first piping part and a second piping part. The first piping part supplies a refrigerant to the magnetocaloric material. The second piping part extracts, from the magnetocaloric material, the refrigerant thus supplied. The second piping includes a third piping part and a fourth piping part. The third piping part supplies a refrigerant to the magnetocaloric material. The fourth piping part extracts, from the magnetocaloric material, the refrigerant thus supplied. The first heat exchanger is connected to the second piping. The second heat exchanger is connected to the fourth piping.

Advantageous Effects of Invention

According to the present disclosure, it is possible to provide the magnetic refrigeration device and the refrigeration cycle device capable of suppressing an increase in device size, an increase in complexity, and an increase in cost.

DESCRIPTION OF EMBODIMENTS

Figure 1:
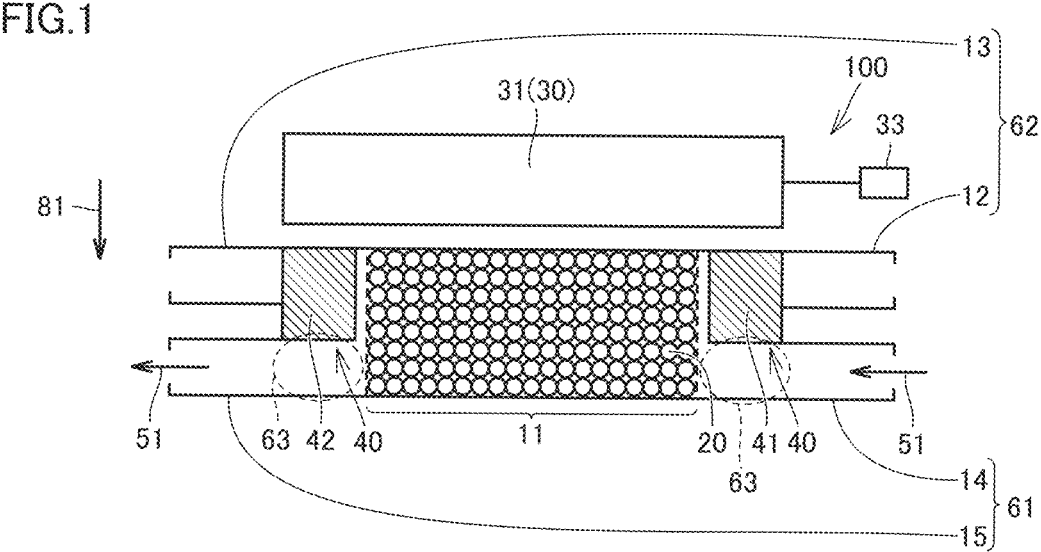
FIG. 1 is a schematic cross-sectional view of a magnetic refrigeration device according to a first embodiment.

Hereinafter, embodiments according to the present invention will be described with reference to the drawings. Note that, in the following drawings, the same or corresponding parts are denoted by the same reference numerals to avoid the description from being redundant.

First Embodiment

<Configuration of Magnetic Refrigeration Device>

Figure 2:
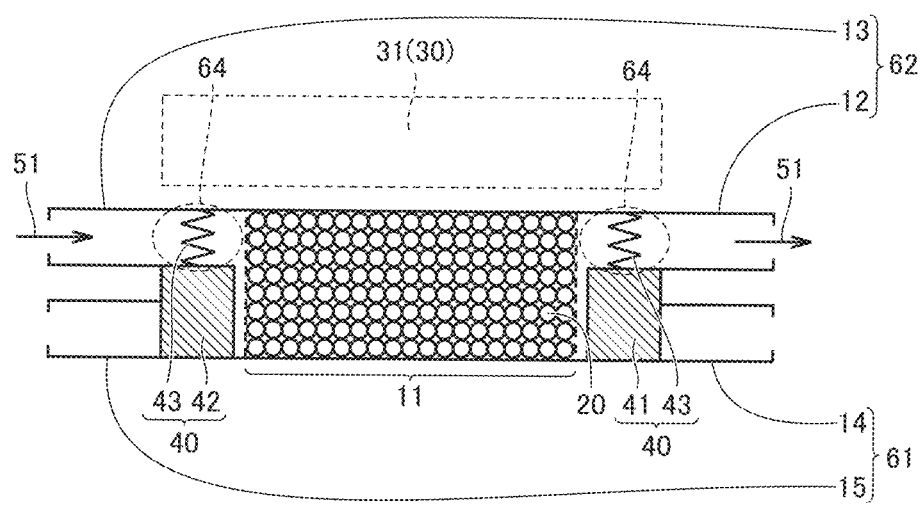
FIG. 2 is a schematic cross-sectional view of the magnetic refrigeration device according to the first embodiment.
Figure 3:
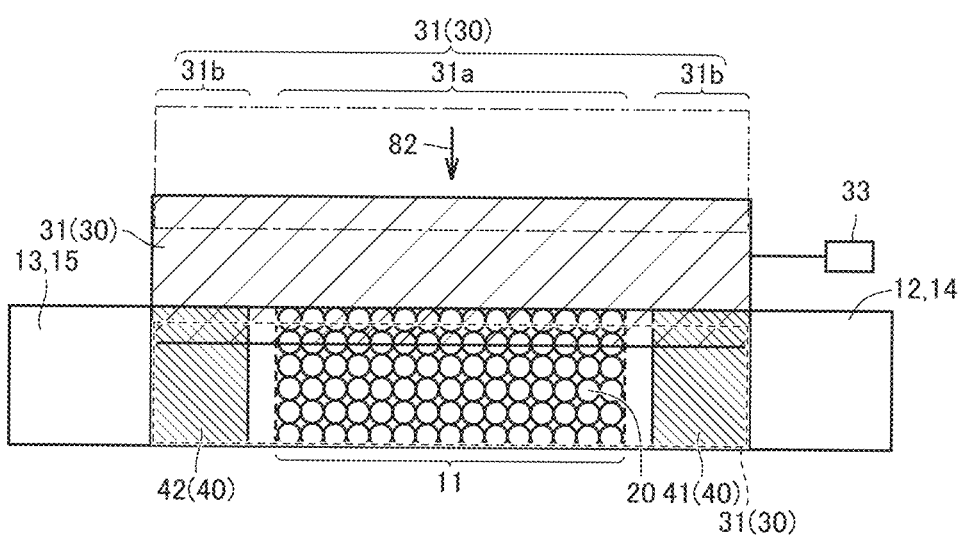
FIG. 3 is a schematic plan view of the magnetic refrigeration device according to the first embodiment.

FIGS. 1 and 2 are schematic cross-sectional views of a magnetic refrigeration device according to a first embodiment. FIG. 1 illustrates a first state of the magnetic refrigeration device to be described later. FIG. 2 illustrates a second state of the magnetic refrigeration device to be described later. FIG. 3 is a schematic plan view of the magnetic refrigeration device according to the first embodiment.

A magnetic refrigeration device 100 illustrated in FIGS. 1 to 3 mainly includes a magnetocaloric material 20, first piping 61, second piping 62, a magnetic field generating unit 30, a switching unit 40, and a refrigerant. Magnetocaloric material 20 is made of a magnetic body that produces a magnetocaloric effect. As the magnetic body, any material may be used as long as the magnetocaloric effect can be produced, and an alloy containing gadolinium (Gd) may be used, for example. Magnetocaloric material 20 may have any shape, and may be a particulate material, for example. Magnetocaloric material 20 is held in a housing 11.

First piping 61 is connected to housing 11 with a set of first connection parts 63 interposed between first piping 61 and housing 11. First piping 61 includes a first piping part 14 and a second piping part 15. First piping part 14 is connected to housing 11 with first connection part 63 interposed between first piping part 14 and housing 11. Second piping part 15 is positioned on a side of magnetocaloric material 20 remote from first piping part 14 connected to magnetocaloric material 20. Second piping part 15 is connected to housing 11 with first connection part 63 interposed between second piping part 15 and housing 11. First piping part 14 and second piping part 15 are arranged in a line. First piping part 14 of first piping 61 supplies the refrigerant to magnetocaloric material 20 in a direction indicated by an arrow 51 in FIG. 1. Second piping part 15 extracts the refrigerant from magnetocaloric material 20 in the direction indicated by arrow 51 in FIG. 1. First piping 61 and second piping 62 may be each connected with a pump for forcing the refrigerant to flow. Examples of the refrigerant include water, water, ethanol, and the like.

Second piping 62 includes a third piping part 13 and a fourth piping part 12. Third piping part 13 is connected to housing 11 with second connection part 64 interposed between third piping part 13 and housing 11. Fourth piping part 12 is positioned on a side of magnetocaloric material 20 remote from third piping part 13 connected to magnetocaloric material 20. Fourth piping part 12 is connected to housing 11 with second connection part 64 interposed between fourth piping part 12 and housing 11. Third piping part 13 and fourth piping part 12 are arranged in a line. Third piping part 13 of second piping 62 supplies the refrigerant to magnetocaloric material 20 in a direction indicated by an arrow 51 in FIG. 2. Fourth piping part 12 extracts the refrigerant from magnetocaloric material 20 in the direction indicated by arrow 51 in FIG. 2. As can be seen from FIGS. 1 and 2, first piping part 14 and fourth piping part 12 are arranged on the same side of magnetocaloric material 20. Second piping part 15 and third piping part 13 are arranged on the same side of magnetocaloric material 20.

As illustrated in FIG. 1, a state where a first magnetic field generating member 31 serving as magnetic field generating unit 30 is placed at a first position adjacent to magnetocaloric material 20 is referred to as a first state. In the first state illustrated in FIG. 1, first magnetic field generating member 31 is placed at the first position and applies a magnetic field to magnetocaloric material 20. As first magnetic field generating member 31, any member may be used as long as a magnetic field can be generated, and a permanent magnet or an electromagnet is used, for example.

First magnetic field generating member 31 may have any shape as viewed from above as long as first magnetic field generating member 31 covers at least a part of magnetocaloric material 20 and switching unit 40 as illustrated in FIG. 3. For example, first magnetic field generating member 31 may have a quadrangular shape as viewed from above.

First magnetic field generating member 31 is moved by a position changing member 33. Position changing member 33 is capable of moving first magnetic field generating member 31 between the first position illustrated in FIG. 1 and a second position relatively remote from magnetocaloric material 20. The first position illustrated in FIG. 1 is a position that lies on top of, as indicated by a dotted line in FIG. 3, magnetocaloric material 20 and switching unit 40 as viewed from above, for example. The second position illustrated in FIG. 2 is a position that does not lie on top of, as indicated by a long dashed short dashed line in FIG. 3, magnetocaloric material 20 and switching unit 40 as viewed from above, for example. Position changing member 33 moves first magnetic field generating member 31 in a direction indicated by an arrow 82 in FIG. 3, for example. As position changing member 33, any component such as a hydraulic cylinder or an actuator may be used. As illustrated in FIG. 2, a state where first magnetic field generating member 31 is placed at the second position (not illustrated) remote from magnetocaloric material 20 relative to first position is referred to as a second state.

Switching unit 40 includes valve members 41, 42 that move in response to the magnetic field generated by magnetic field generating unit 30, and a moving member 43. Valve members 41, 42 each include a magnetic body. Valve members 41, 42 are movable between first connection part 63 and second connection part 64. That is, first connection part 63 and second connection part 64 form one space. The space formed by first connection part 63 and second connection part 64 is provided on both sides of magnetocaloric material 20. First connection part 63 and second connection part 64 are arranged in a line in a first direction (a direction indicated by an arrow 81) in which magnetocaloric material 20 and first magnetic field generating member 31 are aligned in the first state illustrated in FIG. 1.

Moving member 43 is connected to each of valve members 41, 42. Any component may be used as moving member 43, and a spring, an elastic body such as rubber, an actuator, or the like may be used, for example. Moving member 43 moves valve member 41 from second connection part 64 toward first connection part 63.

In the first state illustrated in FIG. 1, first magnetic field generating member 31 is placed at a position (first position) adjacent to magnetocaloric material 20. The magnetic field generated by first magnetic field generating member 31 is applied to magnetocaloric material 20. Further, the magnetic field acts on valve members 41, 42 to place valve members 41, 42 in second connection part 64. Therefore, first connection part 63 is not closed by valve members 41, 42. On the other hand, second connection part 64 is closed by valve members 41, 42. Second piping 62 is blocked by the inside of housing 11 in which magnetocaloric material 20 is disposed and valve members 41, 42.

In the first state illustrated in FIG. 1, the refrigerant is supplied from first piping part 14 of first piping 61 to magnetocaloric material 20 through first connection part 63. Further, the refrigerant is discharged from magnetocaloric material 20 to second piping part 15 of first piping 61 through first connection part 63. The refrigerant flowing through second piping part 15 is introduced into a heat exchanger (not illustrated) or the like.

In the second state illustrated in FIG. 2, first magnetic field generating member 31 is moved to a position (second position) remote from magnetocaloric material 20 relative to the first position illustrated in FIG. 1. This makes valve members 41, 42 less susceptible to the influence of the magnetic field from first magnetic field generating member 31 than in the first state. Further, when first magnetic field generating member 31 is sufficiently separated from valve members 41, 42, valve members 41, 42 come under almost no influence of the magnetic field. This makes the force that moves valve members 41, 42 toward second connection part 64 (toward first magnetic field generating member 31 placed at the first position) smaller. As a result, moving member 43 pushes valve members 41, 42 to move valve members 41, 42 from second connection part 64 to first connection part 63.

In the second state illustrated in FIG. 2, the refrigerant is supplied from third piping part 13 of second piping 62 to magnetocaloric material 20 through second connection part 64. Further, the refrigerant is discharged from magnetocaloric material 20 to fourth piping part 12 of second piping 62 through second connection part 64. The refrigerant flowing through fourth piping part 12 is introduced into a heat exchanger (not illustrated) or the like.

Figure 4:
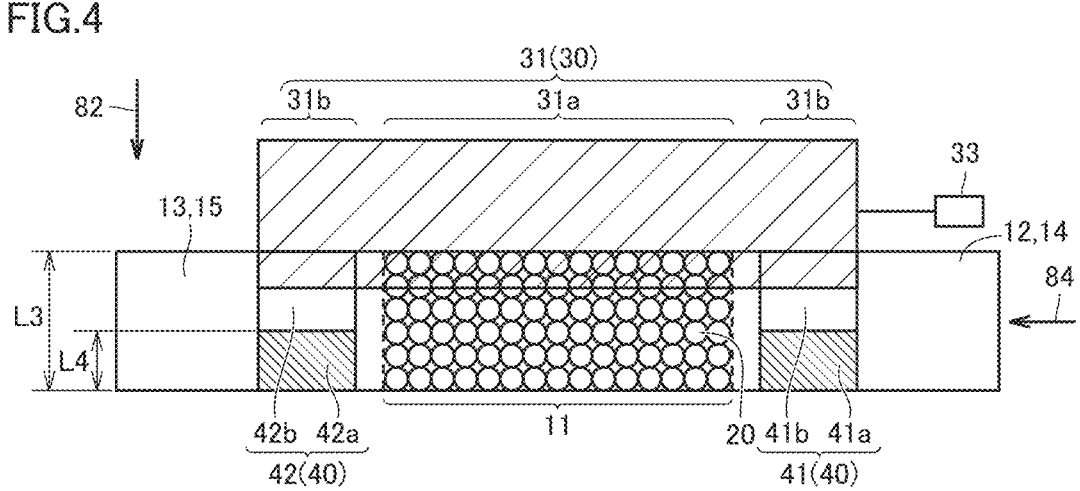
FIG. 4 is a schematic plan view of a first modification of the magnetic refrigeration device according to the first embodiment.
Figure 5:
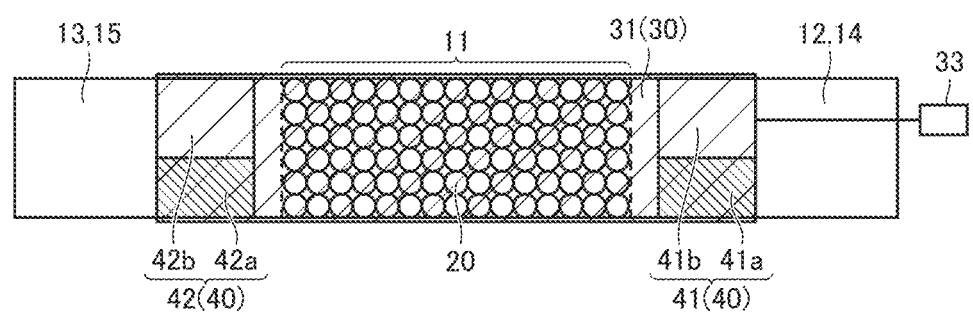
FIG. 5 is a schematic plan view of the first modification of the magnetic refrigeration device according to the first embodiment.
Figure 6:
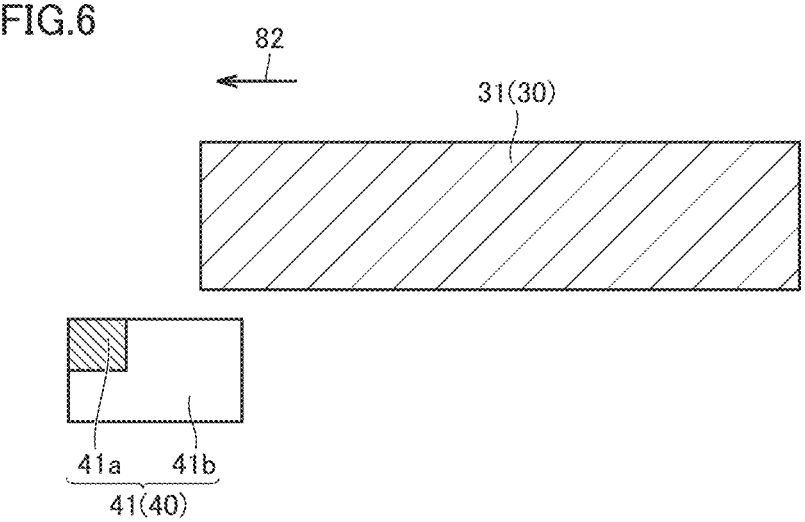
FIG. 6 is a schematic side view of the first modification of the magnetic refrigeration device according to the first embodiment.
Figure 7:
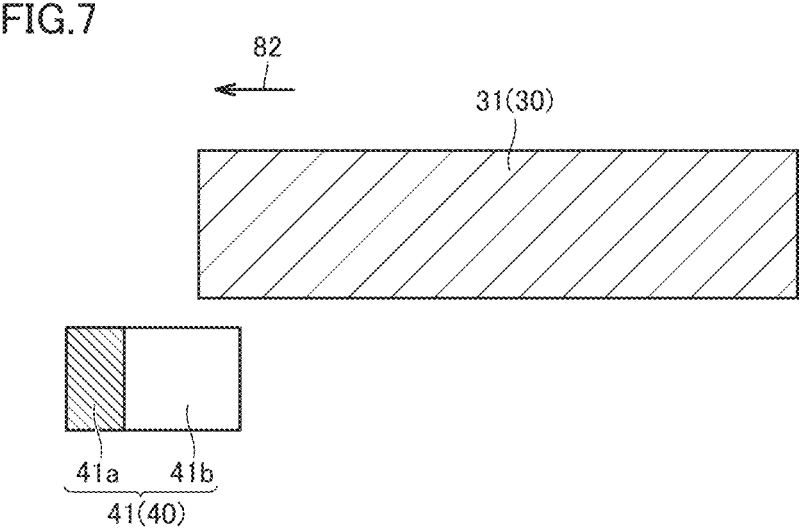
FIG. 7 is a schematic side view of another configuration of the first modification of the magnetic refrigeration device according to the first embodiment.

FIGS. 4 and 5 are schematic plan views of a first modification of the magnetic refrigeration device according to the first embodiment. FIG. 6 is a schematic side view of the first modification of the magnetic refrigeration device according to the first embodiment. FIG. 7 is a schematic side view of another configuration of the first modification of the magnetic refrigeration device according to the first embodiment. FIG. 4 illustrates a state where first magnetic field generating member 31 is being moved to the first position. FIG. 5 illustrates a state where first magnetic field generating member 31 is placed at the first position. FIGS. 6 and 7 are schematic side views of the magnetic refrigeration device as viewed in a direction indicated by an arrow 84 in FIG. 4. FIGS. 6 and 7 illustrate only valve member 41 and first magnetic field generating member 31 for the sake of simplicity.

Magnetic refrigeration device 100 illustrated in FIGS. 4 and 5 is basically the same in configuration as magnetic refrigeration device 100 illustrated in FIGS. 1 to 3, but is different in the structure of valve members 41, 42 of switching unit 40 from magnetic refrigeration device 100 illustrated in FIGS. 1 to 3. Specifically, in magnetic refrigeration device 100 illustrated in FIGS. 4 and 5, valve members 41, 42 include main bodies 41b, 42b and magnetic bodies 41a, 42a, respectively. Main bodies 41b, 42b are each made of a non-magnetic material. Valve members 41, 42 are larger in size than magnetic bodies 41a, 42a or main bodies 41b, 42b so as to hold magnetic bodies 41a, 42a inside. From a different point of view, a length L3 of valve members 41, 42 in a second direction indicated by an arrow 82 in FIG. 4 is longer than a length L4 of magnetic bodies 41a, 42a in the second direction. As can be seen from FIGS. 4 and 6, magnetic body 41a is disposed at an end of main body 41b in a horizontal direction, and an upper side of main body 41b (adjacent to first magnetic field generating member 31) in a thickness direction. From a different point of view, valve member 41 is larger in dimension in the thickness direction than magnetic body 41a.

Further, valve members 41, 42 may have a configuration as illustrated in FIG. 7. Specifically, magnetic body 41a may be disposed at the end of main body 41b in the horizontal direction and be the same in dimension in the thickness direction as main body 41b. Note that, in magnetic refrigeration device illustrated in FIGS. 4 to 7, valve member 42 may be the same in configuration as valve member 41.

Position changing member 33 moves, in the second direction indicated by arrow 82 in FIG. 4, first magnetic field generating member 31 between the first position that lies on top of magnetocaloric material 20 and the second position remote from magnetocaloric material 20 as viewed from above. In order to move first magnetic field generating member 31 from the second position to the first position, position changing member 33 moves first magnetic field generating member 31 in the direction indicated by arrow 82. In order to move first magnetic field generating member 31 to the first position as described above, magnetic bodies 41a, 42a may be each disposed on a downstream side of a corresponding one of valve members 41, 42 in a direction of movement of first magnetic field generating member 31.

First magnetic field generating member 31 includes a first part 31a and a second part 31b. First part 31a faces magnetocaloric material 20 when first magnetic field generating member 31 is placed at the first position. Second part 31b faces valve members 41, 42 when first magnetic field generating member 31 is placed at the first position.

As can be seen from FIGS. 4 and 5, the use of valve members 41, 42 having the structure as described above can make the timing at which first part 31a of first magnetic field generating member 31 lies on top of magnetocaloric material 20 and the timing at which second part 31b of first magnetic field generating member 31 lies on top of magnetic bodies 41a, 42a of valve members 41, 42 different from each other. That is, in FIG. 4, first part 31a lies on top of magnetocaloric material 20 as viewed from above, but second part 31b has yet to lie on top of magnetic bodies 41a, 42a as viewed from above. That is, in FIG. 4, the magnetic field is applied to magnetocaloric material 20, but the magnetic field is not directly applied to magnetic bodies 41a, 42a of valve members 41, 42. Therefore, valve members 41, 42 have not yet moved to second connection part 64 (see FIG. 2) in FIG. 4 and are still placed at first connection part 63. On the other hand, as illustrated in FIG. 5, when second part 31b of first magnetic field generating member 31 lies on top of magnetic bodies 41a, 42a as viewed from above, the magnetic field generated by first magnetic field generating member 31 is directly applied to magnetic bodies 41a, 42a of valve members 41, 42. This causes valve members 41, 42 to move to second connection part 64 (see FIG. 2).

With the configuration described above, it is possible to adjust a difference (time lag) between the timing at which the magnetic field is applied to magnetocaloric material 20 and the timing at which the magnetic field is applied to magnetic bodies 41a, 42a by adjusting the positions of magnetic bodies 41a, 42a of valve members 41, 42.

Figure 8:
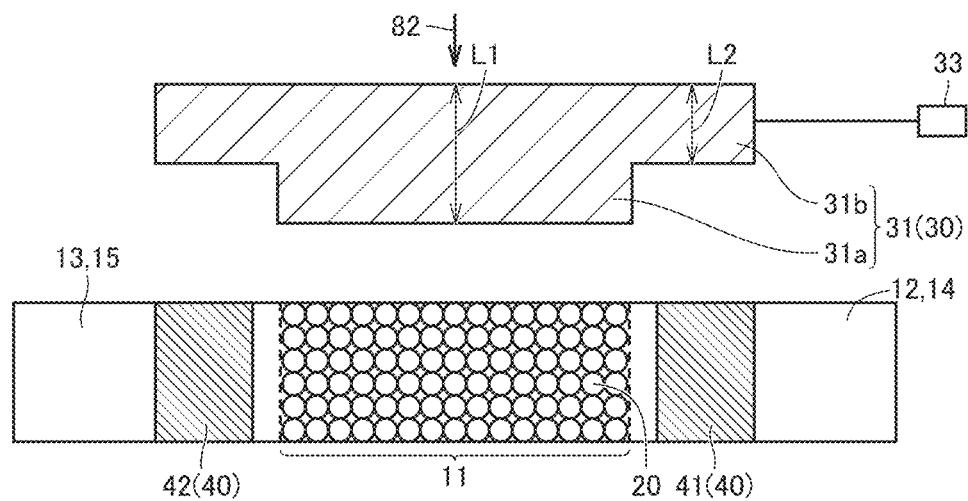
FIG. 8 is a schematic plan view of a second modification of the magnetic refrigeration device according to the first embodiment.
Figure 9:
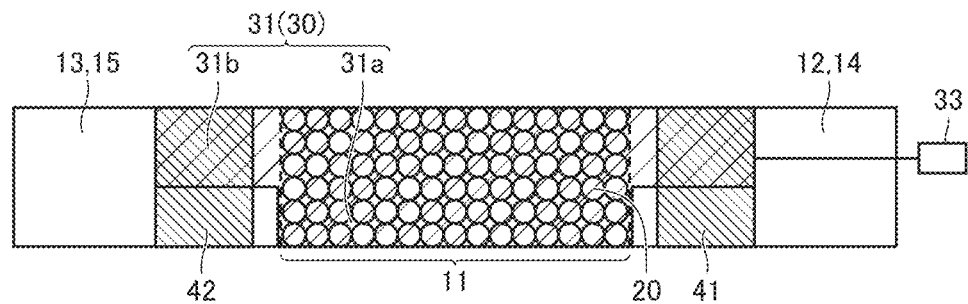
FIG. 9 is a schematic plan view of the second modification of the magnetic refrigeration device according to the first embodiment.

FIGS. 8 and 9 are schematic plan views of a second modification of the magnetic refrigeration device according to the first embodiment. FIG. 8 illustrates a state where first magnetic field generating member 31 is being moved to the first position. FIG. 9 illustrates a state where first magnetic field generating member 31 is placed at the first position.

Magnetic refrigeration device 100 illustrated in FIGS. 8 and 9 is basically the same in configuration as magnetic refrigeration device 100 illustrated in FIGS. 1 to 3, but is different in the structure of first magnetic field generating member 31 from magnetic refrigeration device 100 illustrated in FIGS. 1 to 3. Specifically, in magnetic refrigeration device 100 illustrated in FIGS. 8 and 9, first magnetic field generating member 31 does not have a quadrangular shape as viewed from above.

As illustrated in FIG. 9, when first magnetic field generating member 31 is placed at a position (first position) that lies on top of magnetocaloric material 20 as viewed from above, a part of first magnetic field generating member 31 lying on top of magnetocaloric material 20 is referred to as a first part 31a, and a part lying on top of valve members 41, 42 is referred to as a second part 31b. A length L1 of first part 31a of first magnetic field generating member 31 in the second direction indicated by an arrow 82 is different from a length L2 of second part 31b in the second direction. More specifically, length L2 is shorter than length L1. Further, on a front side of first magnetic field generating member 31 in the direction of movement (second direction) of first magnetic field generating member 31 indicated by arrow 82, second part 31b is recessed from first part 31a. From a different point of view, first part 31a protrudes from second part 31b on the front side in the direction of movement indicated by arrow 82.

As with magnetic refrigeration device 100 illustrated in FIGS. 4 and 5, position changing member 33 moves first magnetic field generating member 31 in the second direction indicated by arrow 82. It is possible to adjust a protrusion length of first part 31a relative to second part 31b on the front side of first magnetic field generating member 31 in the direction of movement by adjusting the difference between length L1 and length L2 described above.

With the above-described configuration, as with magnetic refrigeration device 100 illustrated in FIGS. 4 and 5, it is possible to adjust the difference (time lag) between the timing at which the magnetic field is applied to magnetocaloric material 20 and the timing at which the magnetic field is applied to valve members 41, 42 by adjusting the protrusion length of first part 31a relative to second part 31b.

<Operation of Magnetic Refrigeration Device>

In first piping 61, the refrigerant always flows in the direction indicated by arrow 51 in FIG. 1. In second piping 62, the refrigerant always flows in the direction indicated by arrow 51 in FIG. 2. A heat exchanger (for example, a low-temperature heat exchanger) may be connected to fourth piping part 12. A heat exchanger (for example, a high-temperature heat exchanger) may be connected to second piping part 15.

As illustrated in FIG. 1, when first magnetic field generating member 31 applies the magnetic field to magnetocaloric material 20, valve members 41, 42 each including the magnetic body receive the force generated by the magnetic field (are attracted toward first magnetic field generating member 31) to be positioned at second connection part 64 (upper side). This causes valve members 41, 42 to block the refrigerant (heat carrying refrigerant) flowing through second piping 62. On the other hand, the refrigerant flowing through first piping 61 is not blocked and is supplied from first piping 61 to magnetocaloric material 20. Further, when the magnetic field is applied to magnetocaloric material 20 (more specifically, when the strength of the magnetic field applied to magnetocaloric material 20 increases), magnetocaloric material 20 generates heat.

On the other hand, as illustrated in FIG. 2, when first magnetic field generating member 31 does not apply the magnetic field to magnetocaloric material 20 (when the magnetic field applied to magnetocaloric material 20 disappears), moving member 43 positions valve members 41, 42 at first connection part 63 (lower side). This is because valve members 41, 42 are not subjected to the force (attraction force) generated by the magnetic field and are thus moved by the force directed from moving member 43 toward the first connection part (downward force). This causes valve members 41, 42 to block the refrigerant flowing through first piping 61. On the other hand, the refrigerant flowing through second piping 62 is not blocked and is supplied from second piping 62 to magnetocaloric material 20. Further, when the magnetic field applied magnetocaloric material 20 disappears (more specifically, when the strength of the magnetic field applied to magnetocaloric material 20 decreases), magnetocaloric material 20 absorbs heat.

Further, valve members 41, 42 each include a material reactive to a magnetic field such as a magnetic body, and moving member 43 capable of applying a force in a direction opposite to the force generated by the magnetic field is connected to valve members 41, 42. Therefore, the direction of the force applied to the valve members 41, 42 differs between when the magnetic field is applied to valve members 41, 42 and when the magnetic field is not applied.

With the above-described configuration, when the magnetic field is applied to magnetocaloric material 20 as illustrated in FIG. 1 to cause magnetocaloric material 20 to generate heat, the refrigerant flows from right to left through first piping 61 as indicated by arrow 51 in FIG. 1. At this time, the refrigerant is heated by magnetocaloric material 20 generating heat. The refrigerant thus heated transfers heat to a heat exchanger (high-temperature heat exchanger) connected to second piping part 15 (heats the other medium).

As illustrated in FIG. 2, when the magnetic field applied to magnetocaloric material 20 disappears, magnetocaloric material 20 absorbs heat. At this time, the refrigerant flows from left to right through second piping 62 as indicated by arrow 51 in FIG. 2. The refrigerant is cooled by magnetocaloric material 20 absorbing heat. The refrigerant thus cooled (deprived of heat by magnetocaloric material 20) moves to a heat exchanger (low-temperature heat exchanger) connected to fourth piping part 12 and exchanges heat with the other medium in the heat exchanger (cools the other medium).

Repeating the above-described state illustrated in FIG. 1 and the state illustrated in FIG. 2 allows the other medium to be steadily heated in the high-temperature heat exchanger and allows the other medium to be steadily cooled in the low-temperature heat exchanger.

Note that an inverse magnetocaloric material such as NiMnSn may be used as magnetocaloric material 20. Such a case can also produce the same effect. When such an inverse magnetocaloric material is used as magnetocaloric material 20, magnetocaloric material 20 absorbs heat when the magnetic field is applied to magnetocaloric material 20. On the other hand, when the magnetic field applied to magnetocaloric material 20 disappears, magnetocaloric material 20 generates heat. Therefore, the refrigerant cooled by the inverse magnetocaloric material (magnetocaloric material 20) absorbing heat flows in the direction indicated by arrow 51 in FIG. 1. Further, the refrigerant heated by the inverse magnetocaloric material (magnetocaloric material 20) generating heat flows in the direction indicated by arrow 51 in FIG. 2.

The above-described process does not require a specific control device for synchronizing switching between first piping 61 and second piping 62 and switching between the application and elimination of the magnetic field to and from magnetocaloric material 20. That is, first piping 61 and second piping 62 are automatically switched in response to the magnetic field applied to magnetocaloric material 20. This can make, as compared with a case where such a control device is used, magnetic refrigeration device 100 simple in configuration and make the number of components smaller to reduce the manufacturing cost.

Note that, in FIGS. 1 and 2, first piping 61 and second piping 62 are arranged in a line in the vertical direction, but the direction in which first piping 61 and second piping 62 are aligned may be a different direction (for example, the horizontal direction or a direction inclined from the vertical direction). Further, for example, when first magnetic field generating member 31 and valve members 41, 42 are structured to cause the force applied to valve members 41, 42 during the application of the magnetic field to be directed downward of FIG. 1, and moving member 43 is structured to cause the force applied by moving member 43 to be directed upward of FIG. 1, first piping 61 and second piping 62 may be interchanged.

<Actions and Effects>

Magnetic refrigeration device 100 according to the present disclosure includes magnetocaloric material 20, first piping 61, second piping 62, magnetic field generating unit 30, and switching unit 40. First piping 61 supplies the refrigerant to magnetocaloric material 20 in a first refrigerant direction indicated by arrow 51 in FIG. 1. Second piping 62 supplies the refrigerant to magnetocaloric material 20 in a second refrigerant direction indicated by arrow 51 in FIG. 2 different from the first refrigerant direction. Magnetic field generating unit 30 is capable of applying the magnetic field to magnetocaloric material 20. Switching unit 40 switches between the first state and the second state in response to the magnetic field generated by magnetic field generating unit 30. In the first state, the refrigerant is supplied from first piping 61 to magnetocaloric material 20. In the second state, the refrigerant is supplied from second piping 62 to magnetocaloric material 20.

As described above, it is possible to switch the state of switching unit 40 using the magnetic field applied from magnetic field generating unit 30 to magnetocaloric material 20. It is therefore possible to synchronize the application and elimination of the magnetic field to and from magnetocaloric material 20 with the flow state of the refrigerant without using a specific control device or the like as in the related art. As a result, it is possible to suppress an increase in complexity and size of the magnetic refrigeration device, and it is thus possible to suppress an increase in manufacturing cost.

In magnetic refrigeration device 100 described above, magnetic field generating unit 30 includes first magnetic field generating member 31. In the first state, first magnetic field generating member 31 applies the magnetic field to magnetocaloric material 20 with first magnetic field generating member 31 placed at the first position adjacent to magnetocaloric material 20. First piping 61 is connected to magnetocaloric material 20 at first connection part 63. Second piping 62 is connected to magnetocaloric material 20 at second connection part 64, and first connection part 63 and second connection part 64 are arranged in a line in the first direction in which magnetocaloric material 20 and first magnetic field generating member 31 are aligned in the first state. Switching unit 40 includes valve members 41, 42. Valve members 41, 42 are movable between first connection part 63 and second connection part 64 so as to close second connection part 64 in the first state and to close first connection part 63 in the second state. Valve members 41, 42 each include the magnetic body.

In this case, the magnetic field generated by first magnetic field generating member 31 moves valve members 41, 42 each including the magnetic body between first connection part 63 and second connection part 64, so that it is possible to easily switch between the first state and the second state.

In magnetic refrigeration device 100 described above, switching unit 40 includes moving member 43. Moving member 43 moves valve members 41, 42 from second connection part 64 toward first connection part 63. In this case, when the magnetic field generated by first magnetic field generating member 31 and acting on valve members 41, 42 disappears, valve members 41, 42 can be reliably moved toward first connection part 63.

Magnetic refrigeration device 100 described above further includes position changing member 33 that moves first magnetic field generating member 31. Position changing member 33 moves first magnetic field generating member 31, for example, between the first position illustrated in FIG. 9 and the second position illustrated in FIG. 8 in the second direction intersecting the first direction indicated by arrow 81. The second position is remote from magnetocaloric material 20 relative to the first position. First magnetic field generating member 31 includes first part 31*a* and second part 31*b*. First part 31*a* faces magnetocaloric material 20 when first magnetic field generating member 31 is placed at the first position. Second part 31*b* faces valve members 41, 42 when first magnetic field generating member 31 is placed at the first position. Length L1 of first part 31*a* in the second direction is different from length L2 of second part 31*b* in the second direction.

In this case, it is possible to adjust the difference (time lag) between the timing at which the magnetic field is applied to magnetocaloric material 20 and the timing at which the magnetic field is applied to valve members 41, 42 each including the magnetic body by adjusting length L1 and length L2.

Magnetic refrigeration device 100 described above further includes position changing member 33 that moves first magnetic field generating member 31. Position changing member 33 moves first magnetic field generating member 31 between the first position and the second position in the second direction intersecting the first direction. The second position is remote from magnetocaloric material 20 relative to the first position. First magnetic field generating member 31 includes first part 31*a* and second part 31*b*. First part 31*a* faces magnetocaloric material 20 when first magnetic field generating member 31 is placed at the first position. Second part 31*b* faces valve members 41, 42 when first magnetic field generating member 31 is placed at the first position. Valve members 41, 42 include main bodies 41*b*, 42*b*. Main bodies 41*b*, 42*b* hold magnetic bodies 41*a*, 42*a* inside and are each made of a non-magnetic material. Length L3 of main bodies 41*b*, 42*b* in the second direction indicated by arrow 82 is longer than length L4 of magnetic bodies 41*a*, 42*a* in the second direction.

In this case, it is possible to adjust the difference (time lag) between the timing at which the magnetic field is applied to magnetocaloric material 20 and the timing at which the magnetic field is applied to magnetic bodies 41*a*, 42*a* of valve members 41, 42 by adjusting at least either length L3 and length L4 or the arrangement of magnetic bodies 41*a*, 41*b* in main bodies 41*b*, 42*b*.

Second Embodiment

<Configuration and Operation of Magnetic Refrigeration Device>

Figure 10:
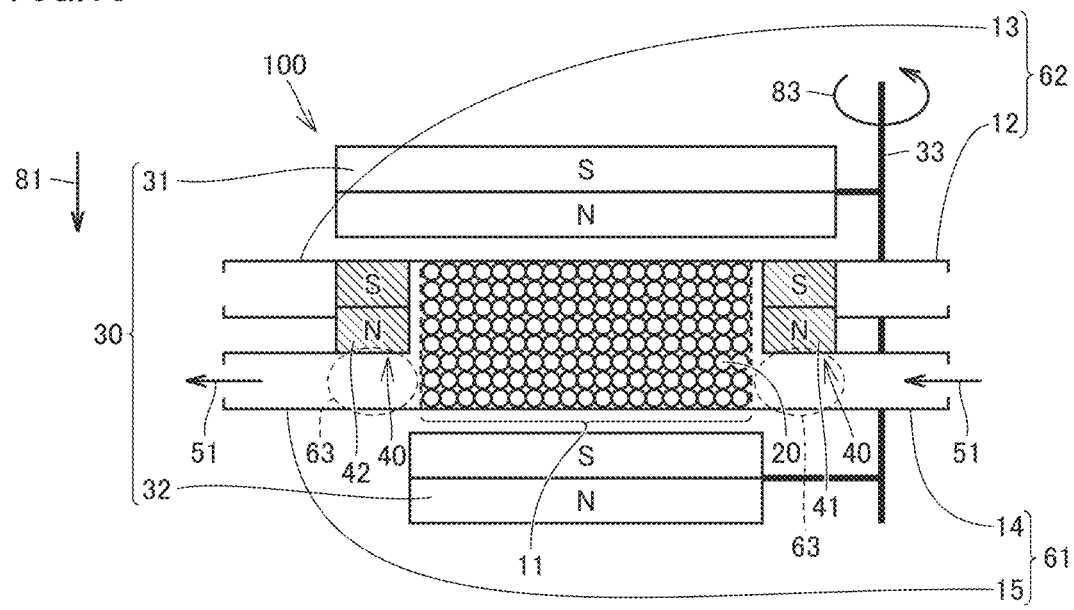
FIG. 10 is a schematic cross-sectional view of a magnetic refrigeration device according to a second embodiment.
Figure 11:
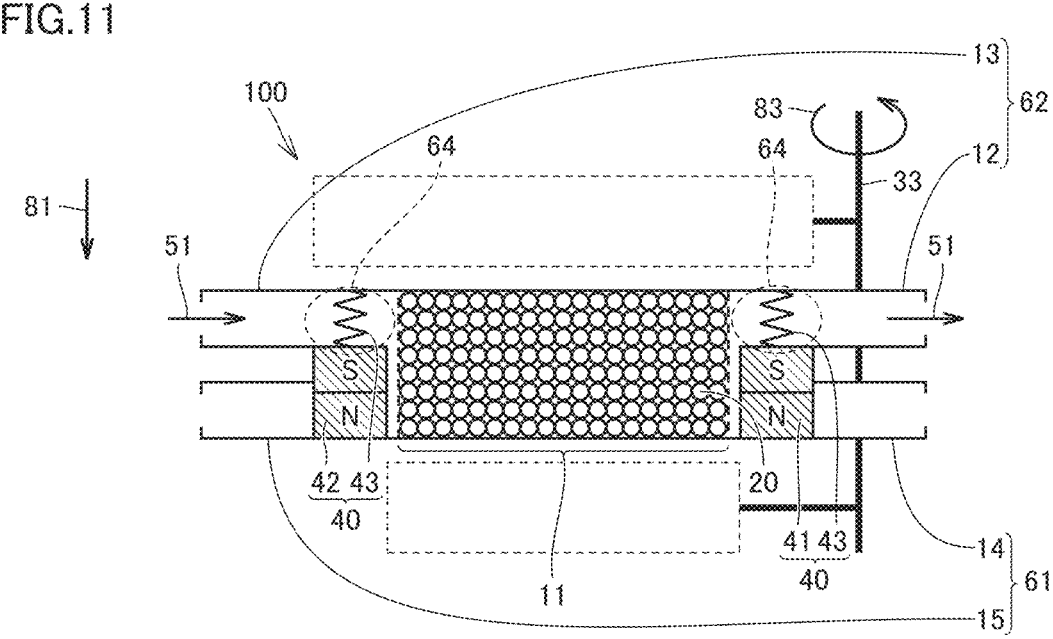
FIG. 11 is a schematic cross-sectional view of the magnetic refrigeration device according to the second embodiment.

FIGS. 10 and 11 are schematic cross-sectional views of a magnetic refrigeration device according to a second embodiment. FIG. 10 illustrates a first state of magnetic refrigeration device 100. FIG. 11 illustrates a second state of magnetic refrigeration device 100. Magnetic refrigeration device 100 illustrated in FIGS. 10 and 11 is basically the same in configuration as magnetic refrigeration device 100 illustrated in FIGS. 1 to 3, but is different in the configurations of switching unit 40 and magnetic field generating unit 30 from magnetic refrigeration device 100 illustrated in FIGS. 1 to 3. Specifically, switching unit 40 of magnetic refrigeration device 100 illustrated in FIGS. 10 and 11 uses a permanent magnet as the magnetic body included in each of valve members 41, 42.

Further, in magnetic refrigeration device 100 illustrated in FIGS. 10 and 11, magnetic field generating unit 30 includes first magnetic field generating member 31 and a second magnetic field generating member 32. First magnetic field generating member 31 and second magnetic field generating member 32 are each a permanent magnet. First magnetic field generating member 31 and second magnetic field generating member 32 can be arranged so as to interpose magnetocaloric material 20 and switching unit 40 between first magnetic field generating member 31 and second magnetic field generating member 32. As viewed in a first direction indicated by an arrow 81, first magnetic field generating member 31 and second magnetic field generating member 32 are different in shape from each other. Specifically, as viewed in the first direction indicated by arrow 81, first magnetic field generating member 31 has a size enough to cover magnetocaloric material 20 and switching unit 40. On the other hand, second magnetic field generating member 32 lies on top of magnetocaloric material 20 as viewed in the first direction, but does not lie on top of switching unit 40. From a different point of view, first magnetic field generating member 31 is larger in size than second magnetic field generating member 32 as viewed in the first direction. First magnetic field generating member 31 and second magnetic field generating member 32 are different in shape from each other.

Such a difference in size causes, when first magnetic field generating member 31 is placed at the first position that lies on top of magnetocaloric material 20 as illustrated in FIG. 10, the magnetic field generated by first magnetic field generating member 31 to directly act on valve members 41, 42. On the other hand, the magnetic field generated by second magnetic field generating member 32 does not have a significant effect on valve members 41, 42.

First magnetic field generating member 31 and second magnetic field generating member 32 are connected to position changing member 33. Position changing member 33 includes a rotary main shaft, a motor connected to the rotary main shaft, and a connection part that connects first magnetic field generating member 31 and second magnetic field generating member 32 to rotary main shaft. The rotation of the rotary main shaft by the motor as indicated by an arrow 83 allows first magnetic field generating member 31 and second magnetic field generating member 32 to revolve (rotationally move). As a result, it is possible to alternately bring about a state (first state) where first magnetic field generating member 31 is placed at the first position that lies on top of magnetocaloric material 20 as illustrated in FIG. 10 and a state (second state) where first magnetic field generating member 31 is placed at a position that does not lie on top of magnetocaloric material 20. In the first state, the magnetic field generated by first magnetic field generating member 31 and second magnetic field generating member 32 is applied to magnetocaloric material 20. In the second state, no magnetic field is applied to magnetocaloric material 20. Note that the configuration of position changing member 33 is not limited to the above-described configuration, and any other configuration may be employed. For example, an actuator or the like that linearly reciprocates first magnetic field generating member 31 and second magnetic field generating member 32 may be used as position changing member 33.

Further, valve members 41, 42 are moved as illustrated in FIGS. 10 and 11 in a manner that depends on whether the magnetic field generated by first magnetic field generating member 31 is applied. Specifically, in the state illustrated in FIG. 10 where first magnetic field generating member 31 is placed at the first position, an N-pole of first magnetic field generating member 31 is placed so as to face magnetocaloric material 20. At this time, an S-pole of first magnetic field generating member 31 is placed on the opposite side of first magnetic field generating member 31 remote from magnetocaloric material 20. Further, as illustrated in FIG. 10, in the state where second magnetic field generating member 32 is placed at a position that lies on top of magnetocaloric material 20, an S-pole of second magnetic field generating member 32 is placed so as to face magnetocaloric material 20. At this time, an N-pole of second magnetic field generating member 32 is placed on the opposite side of second magnetic field generating member 32 remote from magnetocaloric material 20.

Valve members 41, 42 have S-poles placed adjacent to first magnetic field generating member 31 and have N-poles placed adjacent to second magnetic field generating member 32. This causes, when first magnetic field generating member 31 is placed at the position that lies on top of magnetocaloric material 20 as illustrated in FIG. 10, the S-poles of valve members 41, 42 to be attracted toward the N-pole of first magnetic field generating member 31. At this time, since second magnetic field generating member 32 is relatively small in size, the influence of the magnetic field formed by second magnetic field generating member 32 on valve members 41, 42 is relatively small.

On the other hand, as illustrated in FIG. 11, in the state where first magnetic field generating member 31 is placed in a region remote from the position that lies on top of magnetocaloric material 20, valve members 41, 42 are moved by moving member 43 to first connection part 63 relatively remote from first magnetic field generating member 31.

Even with such a configuration, it is possible to produce the same effect as the effect produced by magnetic refrigeration device 100 illustrated in FIGS. 1 to 3.

The N-poles and the S-poles of valve members 41, 42 described above may be interchanged. In this case, moving member 43 is structured to move valve members 41, 42 upward (toward second connection part 64). For example, moving member 43 such as a spring may be disposed between valve members 41, 42 and a bottom surface of first connection part 63. In this case, when first magnetic field generating member 31 is placed at the position that lies on top of magnetocaloric material 20 as illustrated in FIG. 10, valve members 41, 42 are placed at first connection part 63 by the magnetic field generated by first magnetic field generating member 31. Further, when first magnetic field generating member 31 is placed at the position that does not lie on top of magnetocaloric material 20 as illustrated in FIG. 11, valve members 41, 42 are placed at upper second connection part 64 by moving member 43. At this time, first piping 61 and second piping 62 arranged as illustrated in FIGS. 10 and 11 are preferably interchanged.

<Actions and Effects>

Magnetic refrigeration device 100 described above can produce basically the same effect as the effect produced by magnetic refrigeration device 100 illustrated in FIGS. 1 to 3.

Furthermore, in magnetic refrigeration device 100 described above, magnetic field generating unit 30 includes second magnetic field generating member 32 in addition to first magnetic field generating member 31. In the first state illustrated in FIG. 10, second magnetic field generating member 32 faces first magnetic field generating member 31 with magnetocaloric material 20 interposed between second magnetic field generating member 32 and first magnetic field generating member 31.

In this case, second magnetic field generating member 32 can also apply a magnetic field to magnetocaloric material 20. This allows magnetocaloric material 20 to facilitate heat generation and heat absorption by a magnetocaloric effect.

In magnetic refrigeration device 100 described above, first magnetic field generating member 31 is larger in size than second magnetic field generating member 32 as viewed in the first direction indicated by arrow 81. Second magnetic field generating member 32 may be structured not to lie on top of switching unit 40 as viewed in the first direction.

In this case, the influence of the magnetic field generated by second magnetic field generating member 32 on valve members 41, 42 of switching unit 40 can be made smaller than the influence of the magnetic field generated by first magnetic field generating member 31 on valve members 41, 42. It is therefore possible to prevent the operation of valve members 41, 42 from being hindered by second magnetic field generating member 32.

In magnetic refrigeration device 100 described above, position changing member 33 rotationally moves magnetic field generating unit 30. In this case, it is possible to alternately bring about the first state where the magnetic field is applied to magnetocaloric material 20 and the second state where no magnetic field is applied to magnetocaloric material 20 by disposing magnetocaloric material 20 so as to cause magnetocaloric material 20 to face a part of a path on which magnetic field generating unit 30 is rotationally moved.

In magnetic refrigeration device 100 described above, magnetic field generating unit 30 includes a permanent magnet. This eliminates the need for a power supply or the like that causes magnetic field generating unit 30 to generate a magnetic field, so that it is possible to suppress an increase in complexity of the device configuration of magnetic refrigeration device 100.

Third Embodiment

<Configuration of Magnetic Refrigeration Device>

Figure 12:
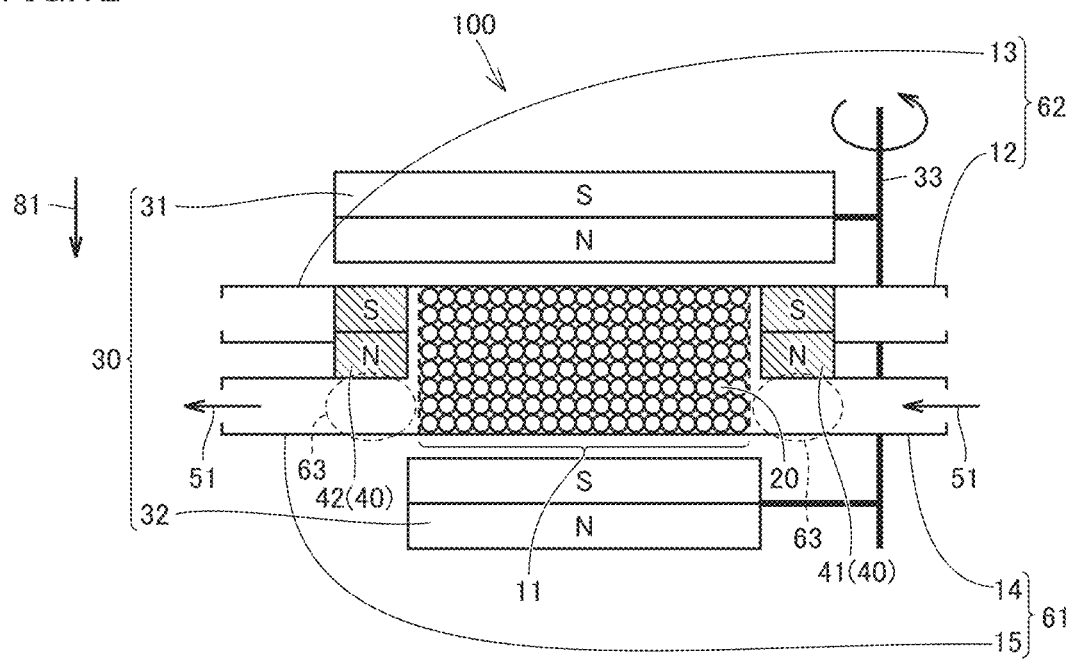
FIG. 12 is a schematic cross-sectional view of a magnetic refrigeration device according to a third embodiment.
Figure 13:
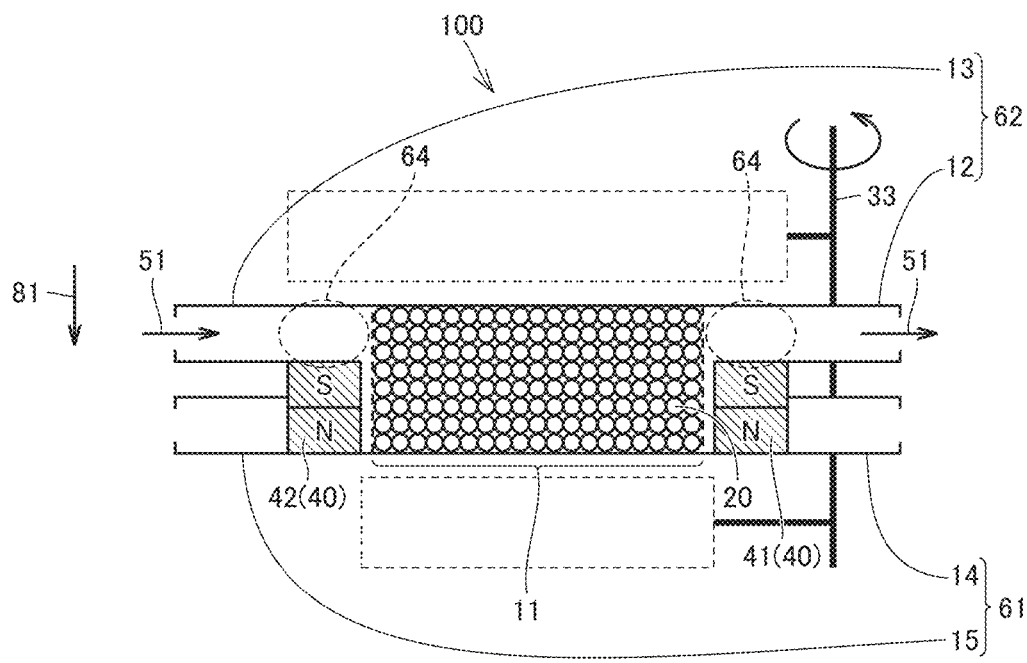
FIG. 13 is a schematic cross-sectional view of the magnetic refrigeration device according to the third embodiment.

FIGS. 12 and 13 are schematic cross-sectional views of a magnetic refrigeration device according to a third embodiment. FIG. 12 illustrates a first state of magnetic refrigeration device 100. FIG. 13 illustrates a second state of magnetic refrigeration device 100. Magnetic refrigeration device 100 illustrated in FIGS. 12 and 13 is basically the same in configuration as magnetic refrigeration device 100 illustrated in FIGS. 10 and 11, but is different in the configuration of switching unit 40 from magnetic refrigeration device 100 illustrated in FIGS. 10 and 11. Specifically, in magnetic refrigeration device 100 illustrated in FIGS. 12 and 13, switching unit 40 includes valve members 41, 42, but does not include moving member 43. A first direction indicated by an arrow 81 is a direction in which first connection part 63 and second connection part 64 are aligned, and the first direction is the vertical direction.

In this case, in the first state illustrated in FIG. 12, valve members 41, 42 are attracted toward first magnetic field generating member 31 by the action of the magnetic field generated by first magnetic field generating member 31. As a result, valve members 41, 42 are placed at the upper side (second connection part 64). On the other hand, in the second state illustrated in FIG. 13, since first magnetic field generating member 31 is placed at a position remote from a region where first magnetic field generating member 31 faces magnetocaloric material 20, valve members 41, 42 are not attracted toward first magnetic field generating member 31. Therefore, valve members 41, 42 move downward (toward first connection part 63) from second connection part 64 by gravity. As a result, valve members 41, 42 are placed at first connection part 63 as illustrated in FIG. 13.

\<Actions and Effects\>

Magnetic refrigeration device 100 described above can produce basically the same effect as the effect produced by magnetic refrigeration device 100 illustrated in FIGS. 1 to 3.

Further, in magnetic refrigeration device 100 described above, the first direction indicated by arrow 81 in which first connection part 63 and second connection part 64 are aligned is the vertical direction. Therefore, gravity can be used in order to move valve members 41, 42 from second connection part 64 to lower first connection part 63. Further, switching unit 40 includes valve members 41, 42 but does not include moving member 43 (see FIG. 2). This can make magnetic refrigeration device 100 simple in device configuration.

Fourth Embodiment

\<Configuration of Magnetic Refrigeration Device\>

Figure 14:
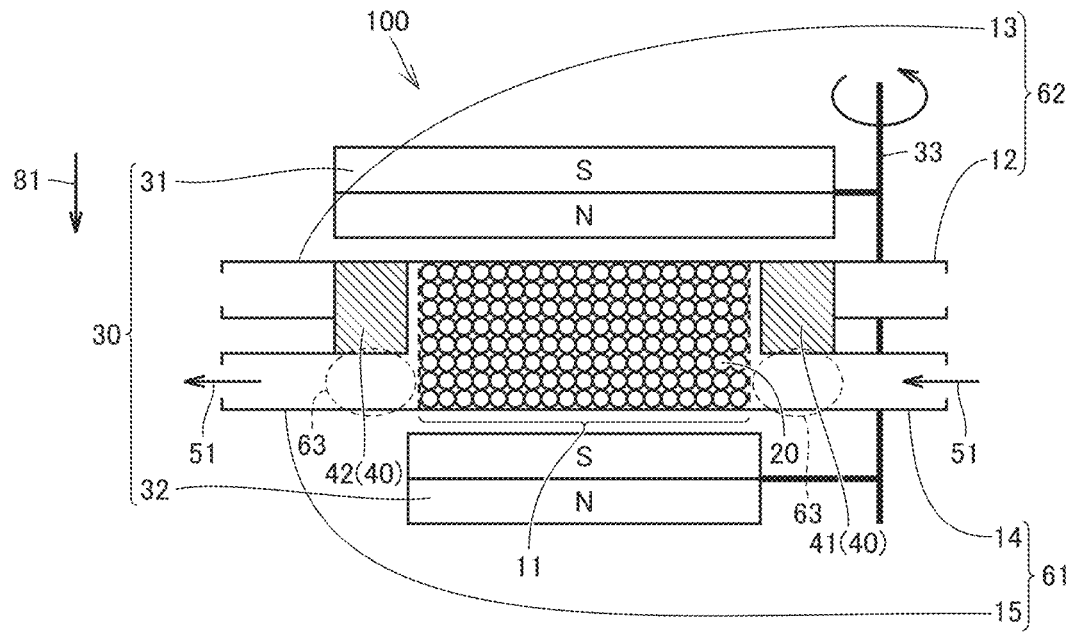
FIG. 14 is a schematic cross-sectional view of a magnetic refrigeration device according to a fourth embodiment.
Figure 15:
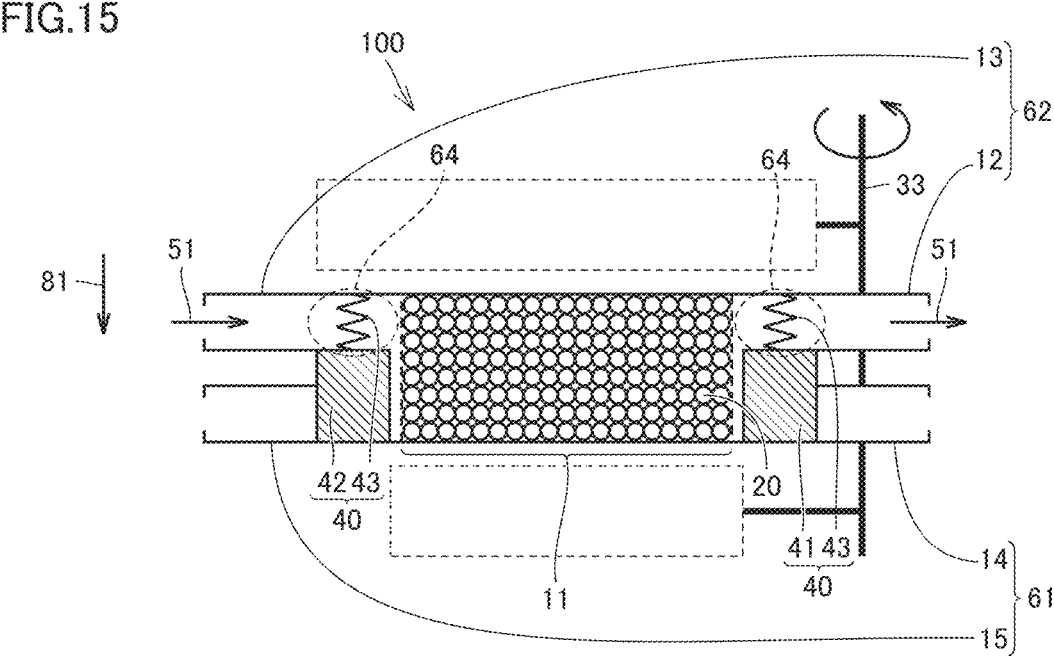
FIG. 15 is a schematic cross-sectional view of the magnetic refrigeration device according to the fourth embodiment.

FIGS. 14 and 15 are schematic cross-sectional views of a magnetic refrigeration device according to a fourth embodiment. FIG. 14 illustrates a first state of magnetic refrigeration device 100. FIG. 15 illustrates a second state of magnetic refrigeration device 100. Magnetic refrigeration device 100 illustrated in FIGS. 14 and 15 is basically the same in configuration as magnetic refrigeration device 100 illustrated in FIGS. 10 and 11, but is different in the configuration of switching unit 40 from magnetic refrigeration device 100 illustrated in FIGS. 10 and 11. Specifically, in magnetic refrigeration device 100 illustrated in FIGS. 14 and 15, valve members 41, 42 are made from the same material as magnetocaloric material 20. Magnetocaloric material 20 is also a magnetic body and receives a physical force in response to the magnetic field, so that magnetocaloric material 20 can act in the same manner as valve members 41, 42 of magnetic refrigeration device 100 illustrated in FIGS. 10 and 11.

\<Actions and Effects\>

Magnetic refrigeration device 100 described above can produce basically the same effect as the effect produced by magnetic refrigeration device 100 illustrated in FIGS. 1 to 3.

Furthermore, in magnetic refrigeration device 100, the magnetic body included in each of valve members 41, 42 contains the same material as magnetocaloric material 20. This also causes valve members 41, 42 to generate and absorb heat due to the magnetocaloric effect caused by the application and elimination of the magnetic field. This in turn allows an increase in capacity of magnetic refrigeration device 100.

Fifth Embodiment

\<Configuration of Magnetic Refrigeration Device\>

Figure 16:
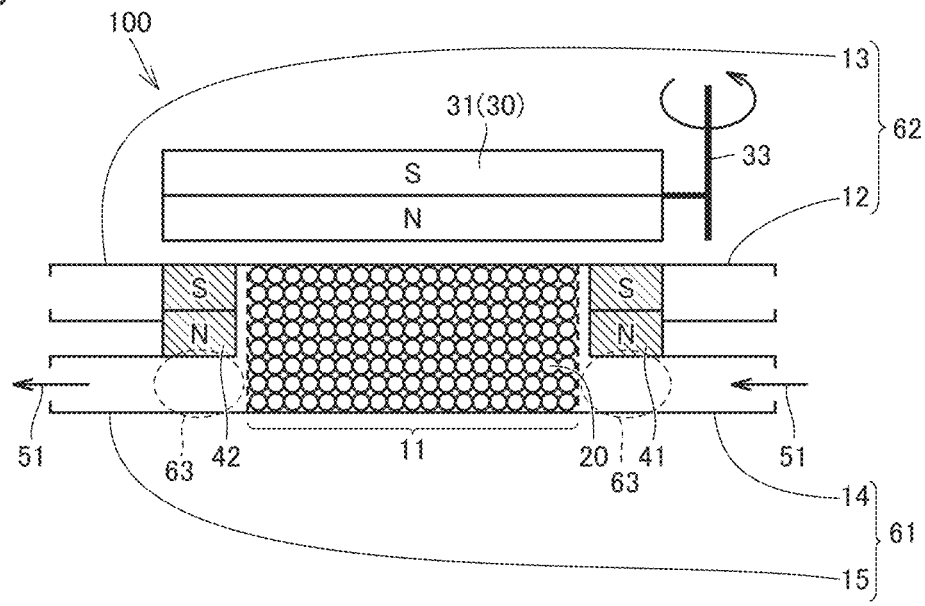
FIG. 16 is a schematic cross-sectional view of a magnetic refrigeration device according to a fifth embodiment.
Figure 17:
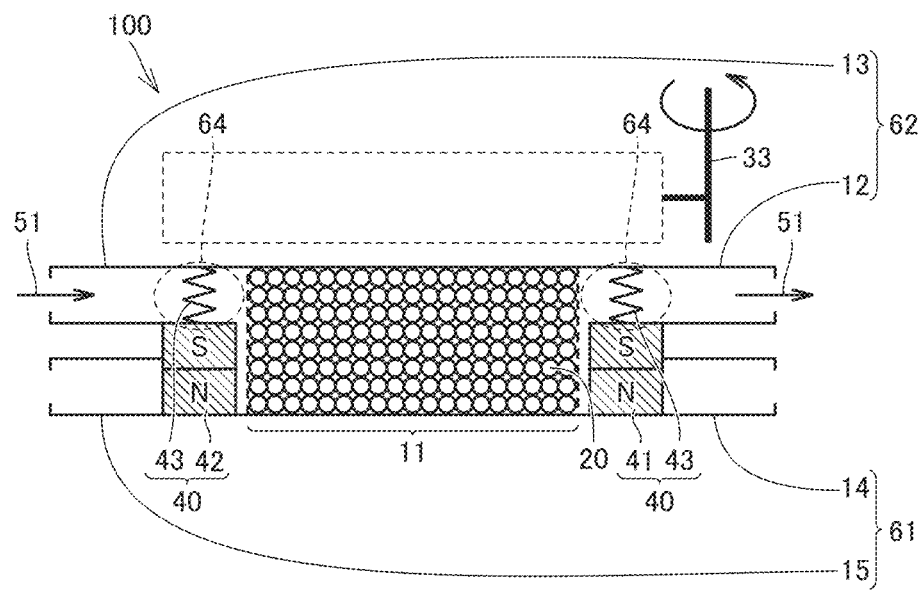
FIG. 17 is a schematic cross-sectional view of the magnetic refrigeration device according to the fifth embodiment.

FIGS. 16 and 17 are schematic cross-sectional views of a magnetic refrigeration device according to a fifth embodiment. FIG. 16 illustrates a first state of magnetic refrigeration device 100. FIG. 17 illustrates a second state of magnetic refrigeration device 100. Magnetic refrigeration device 100 illustrated in FIGS. 16 and 17 is basically the same in configuration as magnetic refrigeration device 100 illustrated in FIGS. 10 and 11, but is different in the configuration of magnetic field generating unit 30 from magnetic refrigeration device 100 illustrated in FIGS. 10 and 11. Specifically, in magnetic refrigeration device 100 illustrated in FIGS. 16 and 17, magnetic field generating unit 30 includes only first magnetic field generating member 31. Even with the configuration where magnetic field generating unit 30 includes only first magnetic field generating member 31 positioned above magnetocaloric material 20 as described above, it is possible to apply and eliminate the magnetic field to and from valve members 41, 42 and magnetocaloric material 20.

\<Actions and Effects\>

Magnetic refrigeration device 100 described above can produce basically the same effect as the effect produced by magnetic refrigeration device 100 illustrated in FIGS. 1 to 3.

Furthermore, in magnetic refrigeration device 100, magnetic field generating unit 30 includes only first magnetic field generating member 31. In the first state, first magnetic field generating member 31 applies the magnetic field to magnetocaloric material 20 with first magnetic field generating member 31 placed at the first position adjacent to magnetocaloric material 20. First piping 61 is connected to magnetocaloric material 20 at first connection part 63. Second piping 62 is connected to magnetocaloric material 20 at second connection part 64, and first connection part 63 and second connection part 64 are arranged in a line in the first direction in which magnetocaloric material 20 and first magnetic field generating member 31 are aligned in the first state. Switching unit 40 includes valve members 41, 42. Valve members 41, 42 are movable between first connection part 63 and second connection part 64 so as to close second connection part 64 in the first state and to close first connection part 63 in the second state. Valve members 41, 42 each include the magnetic body.

In this case, even only with first magnetic field generating member 31, it is possible to apply and eliminate the magnetic field to and from magnetocaloric material 20 and valve members 41, 42. This can make magnetic refrigeration device 100 simple in configuration.

Sixth Embodiment

\<Configuration of Magnetic Refrigeration Device\>

Figure 18:
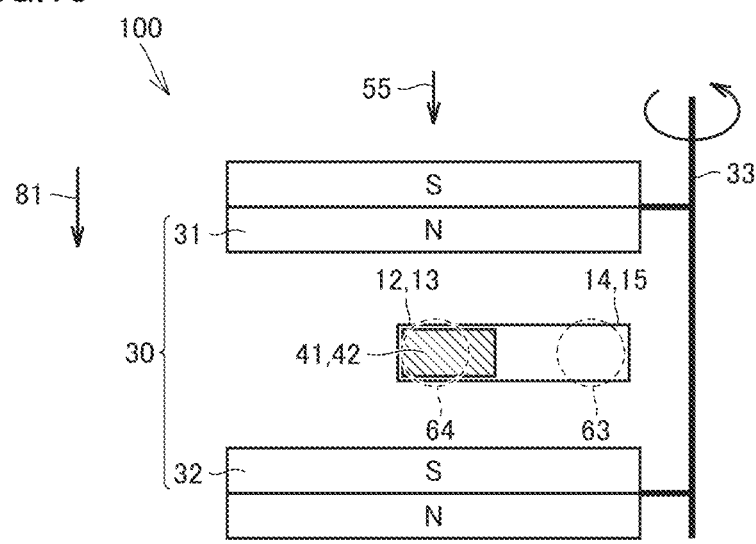
FIG. 18 is a schematic cross-sectional view of a magnetic refrigeration device according to a sixth embodiment.
Figure 19:
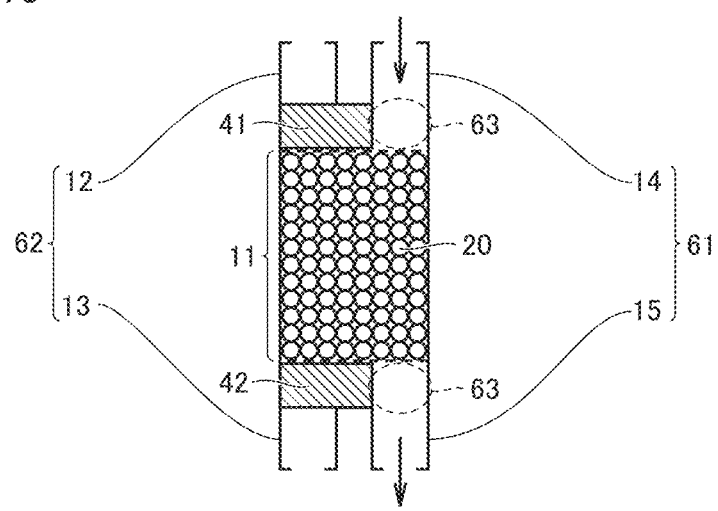
FIG. 19 is a partial schematic plan view of the magnetic refrigeration device illustrated in FIG. 18.
Figure 20:
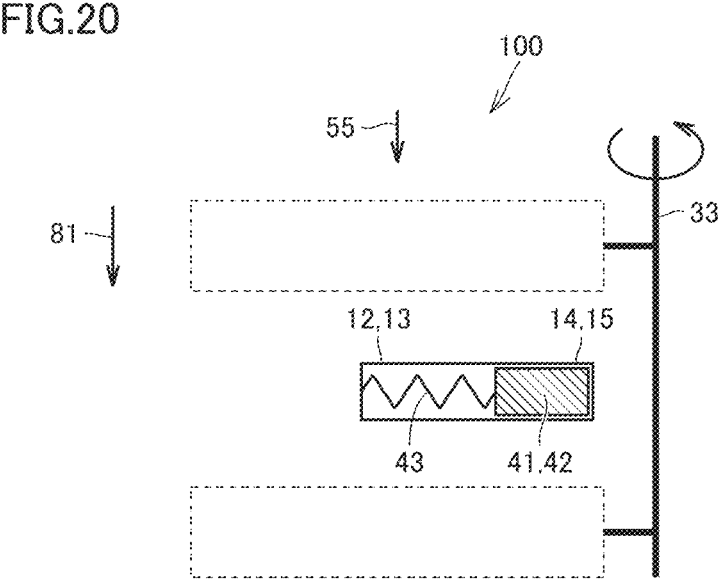
FIG. 20 is a schematic cross-sectional view of the magnetic refrigeration device according to the sixth embodiment.
Figure 21:
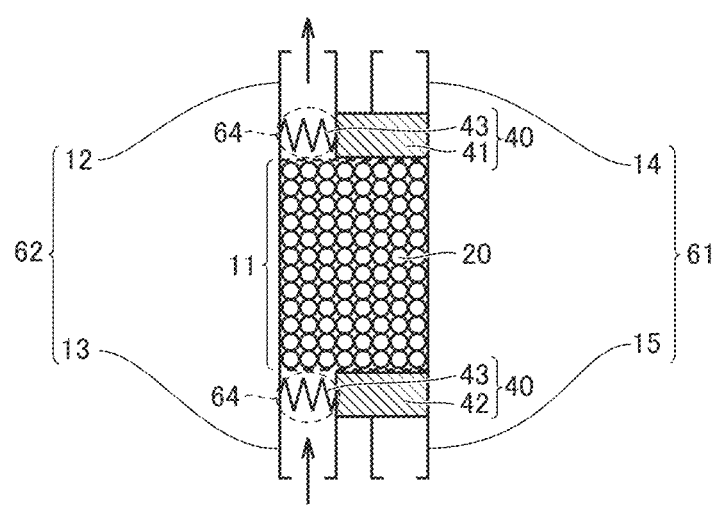
FIG. 21 is a partial schematic plan view of the magnetic refrigeration device illustrated in FIG. 20.

FIG. 18 is a schematic cross-sectional view of a magnetic refrigeration device according to a sixth embodiment. FIG. 19 is a partial schematic plan view of the magnetic refrigeration device illustrated in FIG. 18. FIG. 19 is a partial schematic plan view as viewed in a direction along an arrow 55 in FIG. 18. FIG. 20 is a schematic cross-sectional view of the magnetic refrigeration device according to the sixth embodiment. FIG. 21 is a partial schematic plan view of the magnetic refrigeration device illustrated in FIG. 20. FIG. 21 is a partial schematic plan view as viewed in a direction along an arrow 55 in FIG. 20. FIGS. 18 and 19 illustrate a first state of magnetic refrigeration device 100. FIGS. 20 and 21 illustrate a second state of magnetic refrigeration device 100.

Magnetic refrigeration device 100 illustrated in FIGS. 18 to 21 is basically the same in configuration as magnetic refrigeration device 100 illustrated in FIGS. 10 and 11, but is different from magnetic refrigeration device 100 illustrated in FIGS. 10 and 11 in the configurations of switching unit 40, first piping 61, and second piping 62, and the position of magnetocaloric material 20. Specifically, in magnetic refrigeration device 100 illustrated in FIGS. 18 to 21, first connection part 63 and second connection part 64 are arranged in a line in a direction intersecting the first direction (a direction orthogonal to the first direction in FIG. 18). The first direction is a direction in which magnetocaloric material 20 and first magnetic field generating member 31 are aligned in the first state illustrated in FIGS. 18 and 19, and is a direction indicated by an arrow 81. Note that the direction in which first connection part 63 and second connection part 64 are aligned is not limited to the direction orthogonal to the first direction described above, and may be, for example, a direction having an angle with respect to the first direction within a range of 80° and 100° both inclusive.

In the first state illustrated in FIGS. 18 and 19, first magnetic field generating member 31 and second magnetic field generating member 32 form the magnetic field so as to make magnetic flux density at second connection part 64 larger magnetic flux density at first connection part 63. Specifically, as viewed in the direction indicated by arrow 55 in FIG. 18, second connection part 64 is disposed adjacent to a center of first magnetic field generating member 31 relative to first connection part 63. Further, as viewed in the direction indicated by arrow 55 in FIG. 18, second connection part 64 is disposed adjacent to a center of second magnetic field generating member 32 relative to first connection part 63. Valve members 41, 42 of switching unit 40 each include a magnetic body. Therefore, in first state illustrated in FIGS. 18 and 19, valve members 41, 42 are moved toward a region of the magnetic field generated by magnetic field generating unit 30 where the magnetic flux density is highest. This is because first magnetic field generating member 31 and second magnetic field generating member 32 forms the magnetic field having a gradient in which the magnetic flux density gradually decreases from the center toward the outer periphery as viewed from above. As a result, valve members 41, 42 close second connection part 64.

Further, in the second state illustrated in FIGS. 20 and 21, since the magnetic field applied to valve members 41, 42 disappears, valve members 41, 42 are moved by moving member 43. As a result, valve members 41, 42 move to first connection part 63 to close first connection part 63. As described above, valve members 41, 42 are movable in the direction intersecting the first direction indicated by arrow 81. That is, valve members 41, 42 are movable between first connection part 63 and second connection part 64.

<Actions and Effects>

In magnetic refrigeration device 100 described above, magnetic field generating unit 30 includes first magnetic field generating member 31 and second magnetic field generating member 32. In the first state, first magnetic field generating member 31 applies the magnetic field to magnetocaloric material 20 with first magnetic field generating member 31 placed at the first position adjacent to magnetocaloric material 20. In the first state, second magnetic field generating member 32 faces first magnetic field generating member 31 with magnetocaloric material 20 interposed between second magnetic field generating member 32 and first magnetic field generating member 31. First piping 61 is connected to magnetocaloric material 20 at first connection part 63. Second piping 62 is connected to magnetocaloric material 20 at second connection part 64. First connection part 63 and second connection part 64 are arranged in a line in a direction intersecting the first direction indicated by arrow 81 in which the magnetocaloric material and the first magnetic field generating member are aligned in the first state. In the first state, first magnetic field generating member 31 and second magnetic field generating member 32 form the magnetic field so as to make magnetic flux density at second connection part 64 larger than magnetic flux density at first connection part 63. Switching unit 40 includes valve members 41, 42. Valve members 41, 42 are movable between first connection part 63 and second connection part 64 so as to close second connection part 64 in the first state and to close first connection part 63 in the second state. Valve members 41, 42 each include the magnetic body.

Even with such a configuration, it is possible to produce basically the same effect as the effect produced by magnetic refrigeration device 100 illustrated in FIGS. 1 to 3.

Seventh Embodiment

<Configuration and Operation of Magnetic Refrigeration Device>

Figure 22:
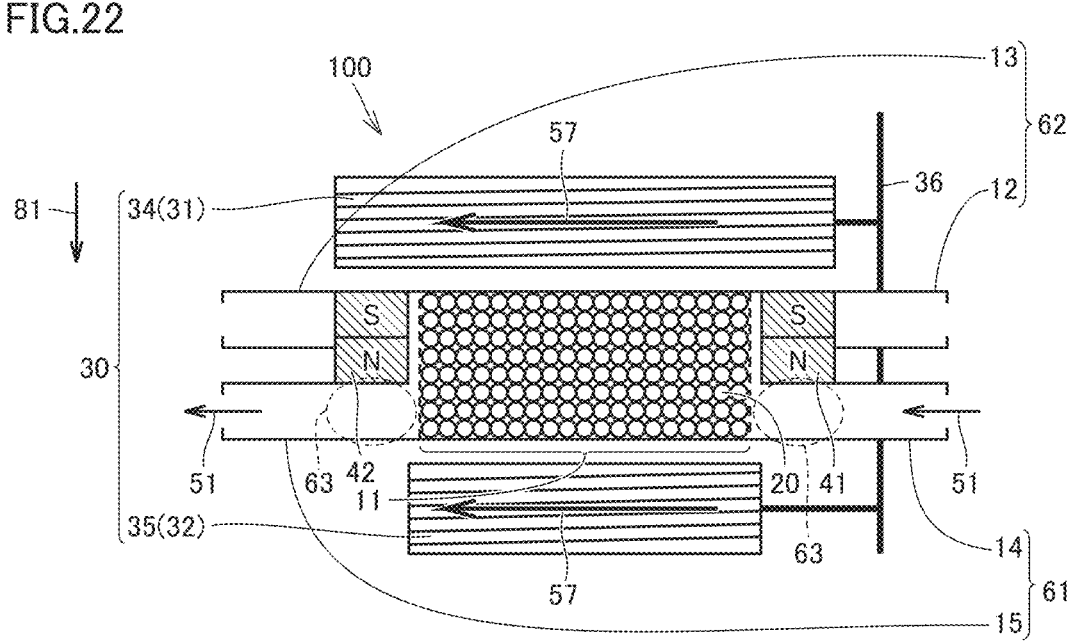
FIG. 22 is a schematic cross-sectional view of a magnetic refrigeration device according to a seventh embodiment.
Figure 23:
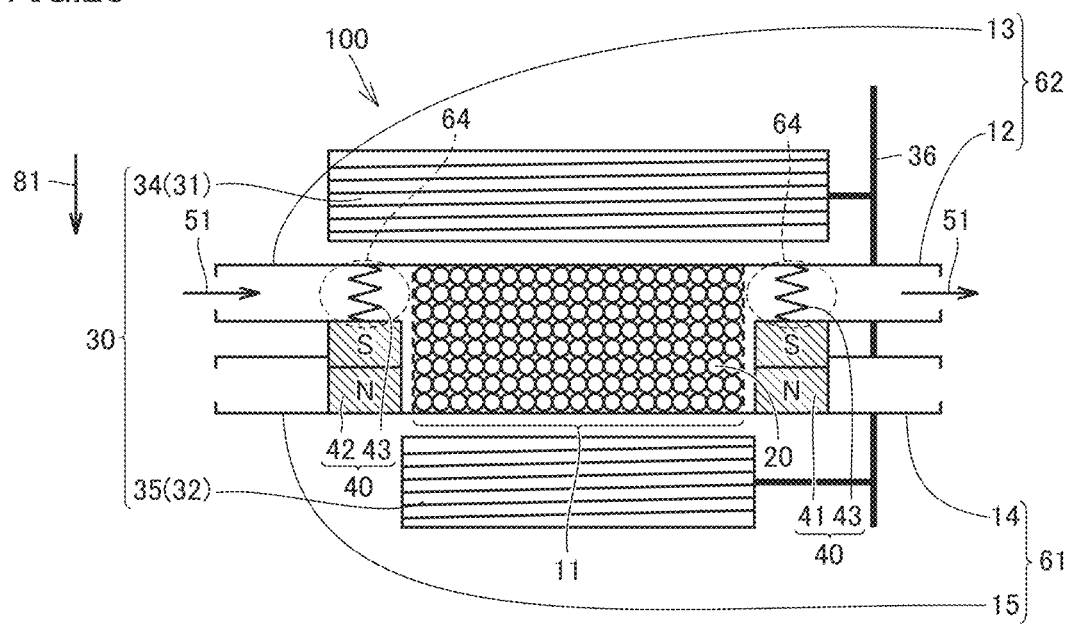
FIG. 23 is a schematic cross-sectional view of the magnetic refrigeration device according to the seventh embodiment.

FIGS. 22 and 23 are schematic cross-sectional views of a magnetic refrigeration device according to a seventh embodiment. FIG. 22 illustrates a first state of magnetic refrigeration device 100. FIG. 23 illustrates a second state of magnetic refrigeration device 100. Magnetic refrigeration device 100 illustrated in FIGS. 22 and 23 is basically the same in configuration as magnetic refrigeration device 100 illustrated in FIGS. 10 and 11, but is different in the configuration of magnetic field generating unit 30 from magnetic refrigeration device 100 illustrated in FIGS. 10 and 11. Specifically, in magnetic refrigeration device 100 illustrated in FIGS. 22 and 23, magnetic field generating unit 30 includes electromagnets 34, 35. Further, magnetic field generating unit 30 includes a support member 36 that supports electromagnets 34, 35 serving as first magnetic field generating member 31 and second magnetic field generating member 32. Support member 36 supports electromagnet 34 serving as first magnetic field generating member 31 with electromagnet 34 placed at a position that lies on top of magnetocaloric material 20 as viewed in a direction indicated by an arrow 81. Electromagnet 35 is supported by support member 36 at a position where electromagnet 35 faces electromagnet 34 with magnetocaloric material 20 interposed between electromagnet 35 and electromagnet 34.

Electromagnets 34, 35 can control ON/OFF of a current to generate or eliminate the magnetic field. This eliminates the need for changing the positions of electromagnets 34, 35 relative to magnetocaloric material 20. Electromagnet 34 has a size large enough to cover, as viewed in the direction indicated by arrow 81, a region that lies on top of magnetocaloric material 20 and valve members 41, 42. Further, as viewed in the direction indicated by arrow 81, electromagnet 34 is larger in size than electromagnet 35. Electromagnet 35 is disposed so as to lie on top of magnetocaloric material 20 as viewed in the direction indicated by arrow 81. That is, electromagnet 35 is disposed at a position that does not lie on top of valve members 41, 42 as viewed in the direction indicated by arrow 81.

In FIG. 22, the current flows through electromagnets 34, 35 in a direction indicated by an arrow 57. As a result, in the magnetic field formed by electromagnet 34, lines of magnetic force are directed toward magnetocaloric material 20. That is, electromagnet 34 forms a magnetic field in the same manner as a permanent magnet having an N-pole disposed adjacent to magnetocaloric material 20. As a result, as illustrated in FIG. 22, valve members 41, 42 are attracted toward electromagnet 34 in response to the magnetic field. Note that a magnetic field applied to magnetocaloric material 20 is further formed by a current flowing through electromagnet 35 in the direction indicated by arrow 57. Since electromagnet 35 is smaller in size than electromagnet 34, the influence of the magnetic field formed by electromagnet 35 on valve members 41, 42 is smaller than the influence of the magnetic field formed by electromagnet 34 on valve members 41, 42.

On the other hand, as illustrated in FIG. 23, when no current flows through electromagnets 34, 35, the influence of the magnetic field on valve members 41, 42 is eliminated as in the case illustrated in FIG. 11. As a result, valve members 41, 42 are moved toward first connection part 63 by moving member 43.

<Actions and Effects>

In magnetic refrigeration device 100 described above, first magnetic field generating member 31 includes electromagnet 34. This allows first magnetic field generating member 31 to switch between the generation and elimination of the magnetic field in response to ON/OFF of the current with respect to electromagnet 34. This eliminates the need for moving electromagnet 34 relative to magnetocaloric material 20. This in turn eliminates the need for providing a mechanism for moving electromagnet 34 in magnetic refrigeration device 100, thereby making magnetic refrigeration device 100 simple in device configuration.

In magnetic refrigeration device 100 described above, valve members 41, 42 are moved in accordance with how the current flows through the electromagnet included in first magnetic field generating member 31. This can produce the same effect as the effect produced by magnetic refrigeration device 100 illustrated in FIGS. 1 to 3 in which the permanent magnet is moved relative to magnetocaloric material 20 and valve members 41, 42.

Eighth Embodiment

<Configuration and Operation of Magnetic Refrigeration Device>

Figure 24:
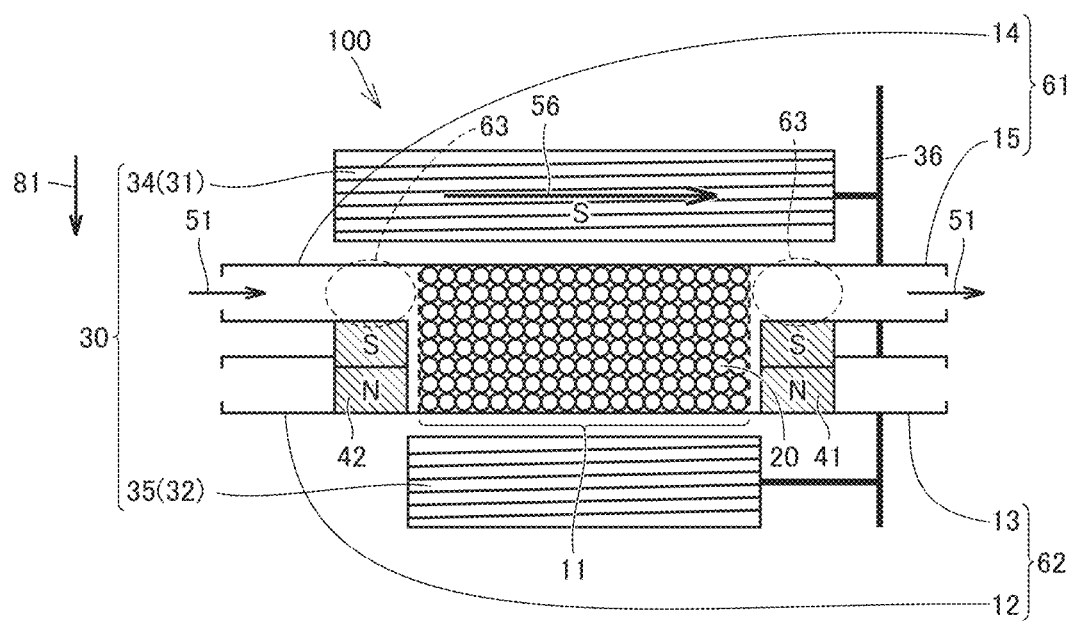
FIG. 24 is a schematic cross-sectional view of a magnetic refrigeration device according to an eighth embodiment.
Figure 25:
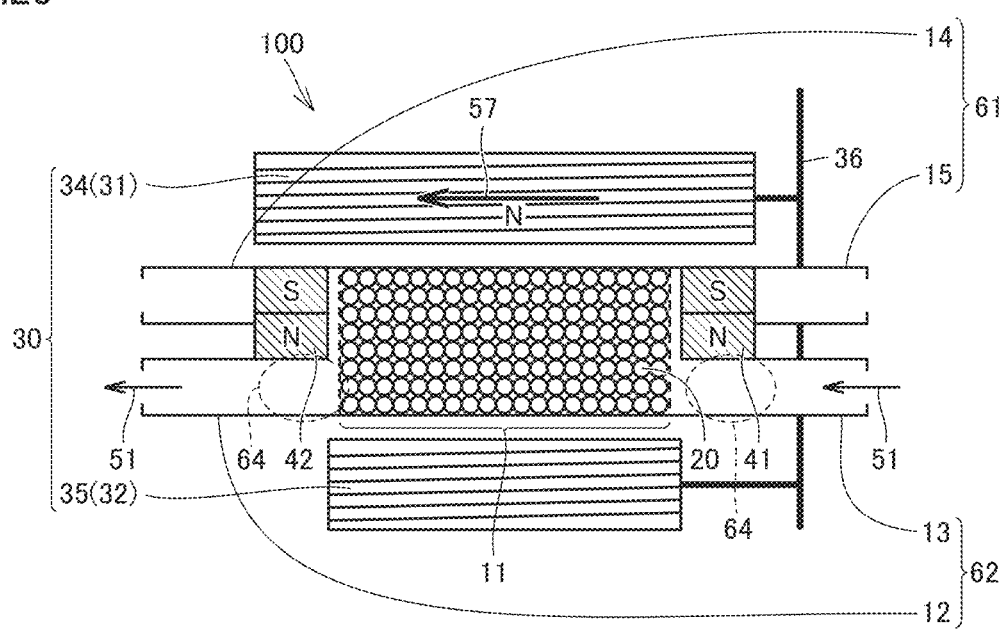
FIG. 25 is a schematic cross-sectional view of the magnetic refrigeration device according to the eighth embodiment.
Figure 26:
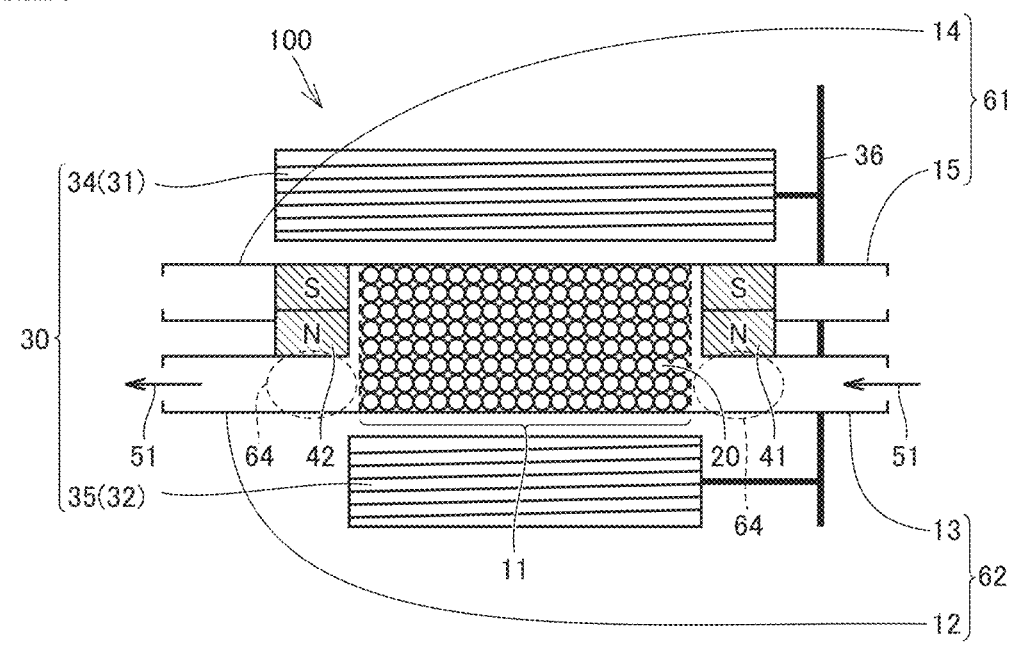
FIG. 26 is a schematic cross-sectional view of the magnetic refrigeration device according to the eighth embodiment.
Figure 27:
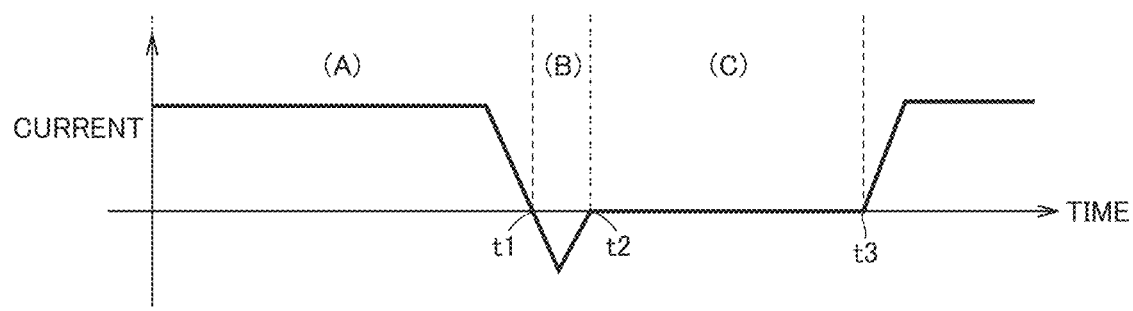
FIG. 27 is a graph showing temporal changes in current flowing through a magnetic field generating unit of the magnetic refrigeration device according to the eighth embodiment.

FIGS. 24, 25, and 26 are schematic cross-sectional views of a magnetic refrigeration device according to an eighth embodiment. FIG. 27 is a graph showing temporal changes in current flowing through a magnetic field generating unit of the magnetic refrigeration device according to the eighth embodiment. FIG. 24 illustrates a first state of magnetic refrigeration device 100. FIGS. 25 and 26 illustrate a second state of magnetic refrigeration device 100. Magnetic refrigeration device 100 illustrated in FIGS. 24 to 26 is basically the same in configuration as magnetic refrigeration device 100 illustrated in FIGS. 22 and 23, but is different from magnetic refrigeration device 100 illustrated in FIGS. 22 and 23 in the arrangement of first piping 61 and second piping 62, and the configuration of switching unit 40.

Specifically, in magnetic refrigeration device 100 illustrated in FIGS. 24 to 26, first piping 61 is disposed at a side (upper side) adjacent to electromagnet 34 serving as first magnetic field generating member 31 relative to second piping 62. That is, first connection part 63 is disposed above second connection part 64 (adjacent to electromagnet 34). Further, switching unit 40 has a positioning mechanism for positioning valve members 41, 42 at first connection part 63 with no magnetic field applied. The positioning mechanism may have any configuration, and an elastic member such as a spring disposed below valve members 41, 42 may be used, for example. The elastic member pushes valve members 41, 42 toward electromagnet 34.

Next, how magnetic refrigeration device 100 operates will be described with reference to FIGS. 24 to 27. Note that, in FIG. 27, the horizontal axis represents the time, and the vertical axis represents the magnitude of the current flowing through electromagnet 34. As illustrated in FIG. 24, the current flows through electromagnet 34 in a direction indicated by an arrow 56. In this state, a lower side (side adjacent to magnetocaloric material 20) of electromagnet 34 becomes an S-pole. Valve members 41, 42 are permanent magnets each having an upper side (side adjacent to electromagnet 34) serving as an S-pole. Therefore, as illustrated in FIG. 24, valve members 41, 42 receives a force (repulsive force) from the magnetic field formed by electromagnet 34 to be placed at a region (second connection part 64) relatively remote from electromagnet 34. As indicated by arrow 51, the refrigerant is supplied from first piping part 14 of first piping 61 to magnetocaloric material 20. The refrigerant heated by magnetocaloric material 20 is discharged to second piping part 15. The state illustrated in FIG. 24 corresponds to a period A from a starting point to a time point t1 in FIG. 27.

Next, as illustrated in FIG. 25, the current is applied to electromagnet 34 in a direction indicated by an arrow 57, which is a direction opposite to the direction of FIG. 24. The current at this time is smaller in magnitude than the current in the case illustrated in FIG. 24. In this case, the lower side of electromagnet 34 becomes an N-pole. In this state, the S-poles of valve members 41, 42 are attracted toward electromagnet 34. This causes, as illustrated in FIG. 25, valve members 41, 42 to move from the lower side (second connection part 64) to the upper side (first connection part 63). Such a process of causing the current to flow through electromagnet 34 to move valve members 41, 42 corresponds to a period B from time point t1 to a time point t2 in FIG. 27.

Next, as illustrated in FIG. 26, the magnitude of the current flowing through electromagnet 34 is set at zero. This causes the magnetic field generated by electromagnet 34 to disappear. At this time, although the force generated by the magnetic field applied to valve members 41, 42 disappears, the action of the positioning mechanism described above keeps valve members 41, 42 at first connection part 63. In the state illustrated in FIGS. 25 and 26, second piping 62 supplies the refrigerant to magnetocaloric material 20. At this time, the refrigerant is cooled by magnetocaloric material 20. Such a process illustrated in FIG. 26 corresponds to a period C from time point t2 to a time point t3 in FIG. 27. Note that, in period A and period B described above, the current may also be applied to electromagnet 35 in the same manner as to electromagnet 34.

<Actions and Effects>

Magnetic refrigeration device 100 described above can produce basically the same effect as the effect produced by magnetic refrigeration device 100 illustrated in FIGS. 1 to 3. Furthermore, for magnetic refrigeration device 100 described above, in the first state illustrated in FIG. 24, a direction in which the current flows through electromagnet 34 is defined as a first current direction indicated by arrow 56. In this case, upon switching from the first state to the second state illustrated in FIG. 26, the current flows through electromagnet 34 in a direction opposite to the first current direction (direction indicated by arrow 57). As described above, it is possible to control the operation of valve members 41, 42 by controlling the flow of current through electromagnet 34. That is, controlling the current flowing through electromagnet 34 makes it possible to control the operation of valve members 41, 42 to move valve members 41, 42 to either first connection part 63 or second connection part 64.

Ninth Embodiment

<Configuration of Refrigeration Cycle Device>

Figure 28:
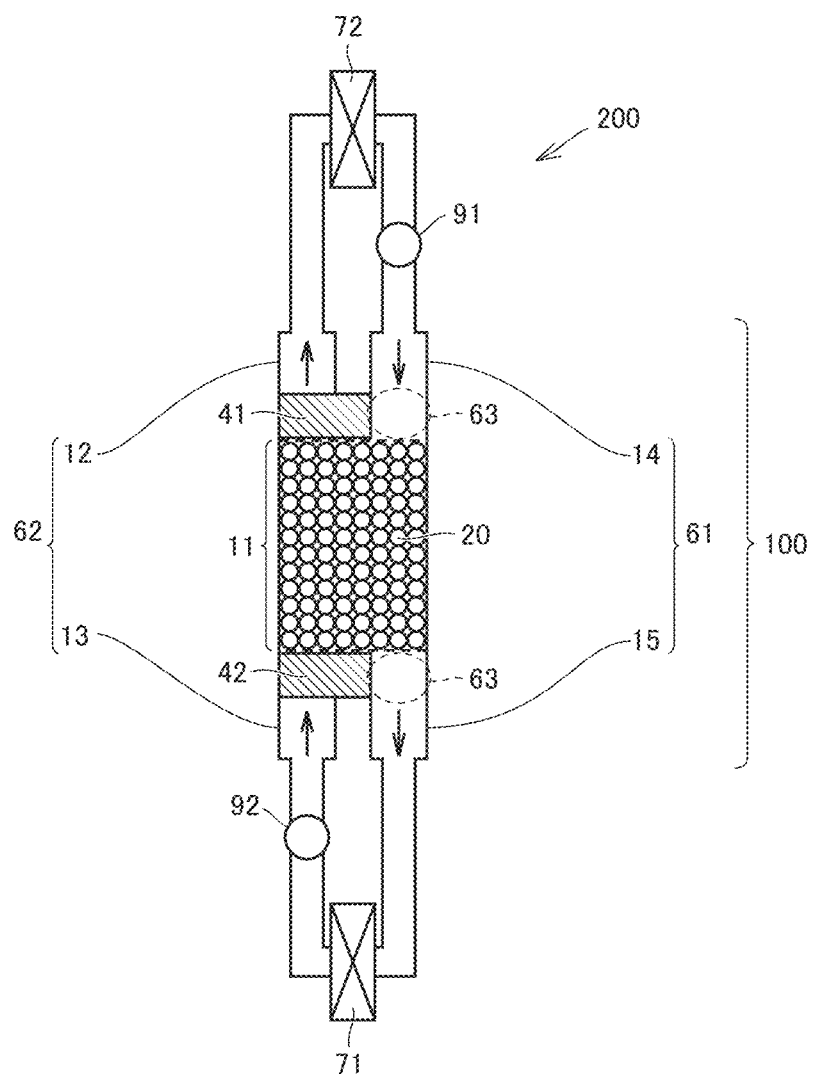
FIG. 28 is a schematic diagram illustrating a refrigeration cycle device according to a ninth embodiment.
Figure 29:
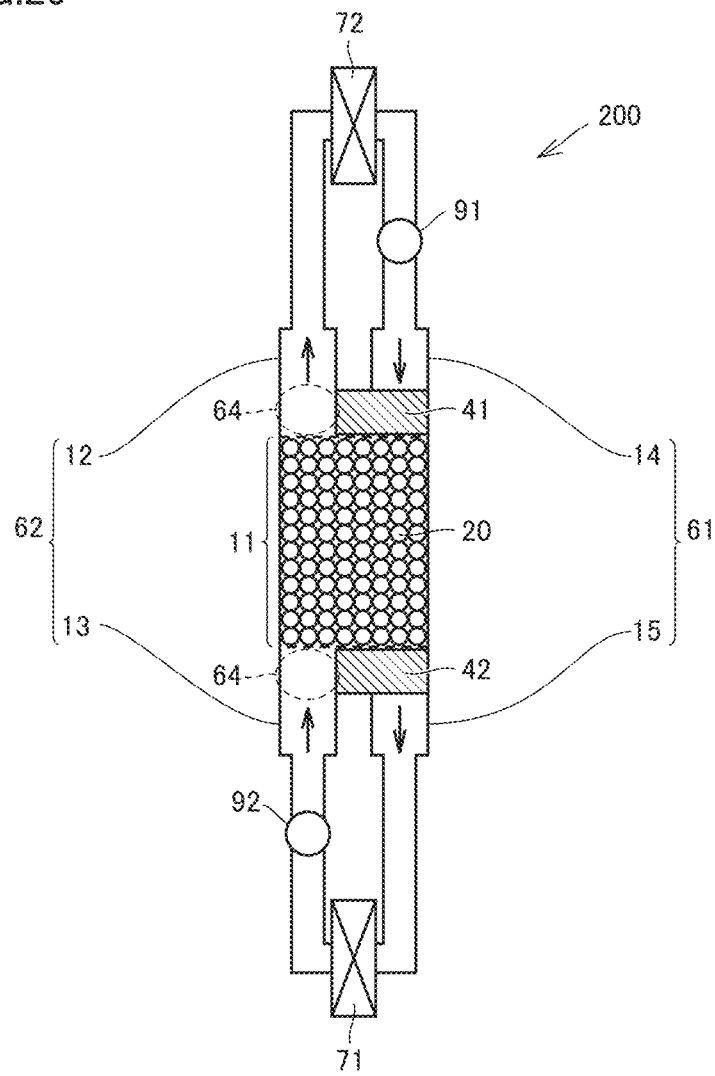
FIG. 29 is a schematic diagram illustrating the refrigeration cycle device according to the ninth embodiment.

FIGS. 28 and 29 are schematic diagrams illustrating a refrigeration cycle device according to a ninth embodiment. FIG. 28 illustrates a case where magnetic refrigeration device 100 that is a part of a refrigeration cycle device 200 is in the first state. FIG. 29 illustrates a case where magnetic refrigeration device 100 that is a part of refrigeration cycle device 200 is in the second state. Note that magnetic field generating unit 30 is not illustrated in FIGS. 28 and 29.

Refrigeration cycle device 200 illustrated in FIGS. 28 and 29 mainly includes magnetic refrigeration device 100 described above, a first heat exchanger 71, a second heat exchanger 72, and pumps 91, 92. First heat exchanger 71 is a high-temperature heat exchanger. Second heat exchanger 72 is a low-temperature heat exchanger. In magnetic refrigeration device 100, first piping 61 includes first piping part 14 and second piping part 15. First piping part 14 supplies a refrigerant to magnetocaloric material 20. Second piping part 15 extracts, from magnetocaloric material 20, the refrigerant thus supplied. Second piping 62 includes third piping part 13 and fourth piping part 12. Third piping part 13 supplies the refrigerant to magnetocaloric material 20. Fourth piping part 12 extracts, from magnetocaloric material 20, the refrigerant thus supplied.

First heat exchanger 71 is connected to second piping part 15 and third piping part 13. Second heat exchanger 72 is connected to fourth piping part 12 and first piping part 14. Refrigeration cycle device 200 illustrated in FIGS. 28 and 29 is a closed loop in which the refrigerant flow through magnetocaloric material 20, second piping part 15, first heat exchanger 71, pump 92, third piping part 13, magnetocaloric material 20, fourth piping part 12, second heat exchanger 72, pump 91, first piping part 14, and magnetocaloric material 20 in this order. In FIG. 28, magnetic refrigeration device 100 is in the first state illustrated in FIG. 10 and the like, and a magnetic field is applied to magnetocaloric material 20 from the magnetic field generating unit (not illustrated). In FIG. 29, magnetic refrigeration device 100 is in the second state illustrated in FIG. 11 and the like, and no magnetic field is applied to magnetocaloric material 20. Note that as the configuration of magnetic refrigeration device 100 illustrated in FIGS. 28 and 29, the configuration of magnetic refrigeration device 100 according to any one of the first to eighth embodiments may be employed.

<Operation of Refrigeration Cycle Device>

As illustrated in FIG. 28, in the first state, the refrigerant is heated by magnetocaloric material 20. The refrigerant thus heated is transferred to first heat exchanger 71 through second piping part 15. In first heat exchanger 71, the heat is released from the refrigerant to the outside of first heat exchanger 71. That is, first heat exchanger 71 heats an external medium. Further, the temperature of the refrigerant decreases in first heat exchanger 71.

Subsequently, in the second state illustrated in FIG. 29, the refrigerant whose temperature has decreased in first heat exchanger 71 is supplied to magnetocaloric material 20 through third piping part 13 by pump 92. In FIG. 29, magnetocaloric material 20 absorbs heat as the magnetic field disappears, so that the refrigerant is cooled by magnetocaloric material 20. The refrigerant thus cooled is transferred from fourth piping part 12 to second heat exchanger 72. In second heat exchanger 72, the refrigerant absorbs heat from the outside of second heat exchanger 72. That is, second heat exchanger 72 cools the external medium. Further, the temperature of the refrigerant increases in second heat exchanger 72. The refrigerant discharged from second heat exchanger 72 is supplied to magnetocaloric material 20 through first piping part 14 by pump 91 in the first state illustrated in FIG. 28.

<Actions and Effects>

Refrigeration cycle device 200 according to the present disclosure includes magnetic refrigeration device 100 described above, first heat exchanger 71, and second heat exchanger 72. In magnetic refrigeration device 100, first piping 61 includes first piping part 14 and second piping part 15. First piping part 14 supplies the refrigerant to magnetocaloric material 20. Second piping part 15 extracts, from magnetocaloric material 20, the refrigerant thus supplied. Second piping 62 includes third piping part 13 and fourth piping part 12. Third piping part 13 supplies the refrigerant to magnetocaloric material 20. Fourth piping part 12 extracts, from magnetocaloric material 20, the refrigerant thus supplied. First heat exchanger 71 is connected to second piping part 15. First heat exchanger 71 is connected to third piping part 13. Second heat exchanger 72 is connected to fourth piping part 12. Second heat exchanger 72 is connected to first piping part 14.

Accordingly, repeating the first state where the magnetic field is applied to magnetocaloric material 20 and the second state where the magnetic field applied to the magnetocaloric material 20 disappears in magnetic refrigeration device 100 allows first heat exchanger 71 to heat the external medium and allows second heat exchanger 72 to cool the external medium. In addition, the use of magnetic refrigeration device 100 described above allows valve members 41, 42 to move using the magnetic field applied to magnetocaloric material 20. This can make refrigeration cycle device 200 simple in device configuration as compared with a case where another drive device or control device is used to move valve members 41, 42. This in turn makes it possible to suppress an increase in size, an increase in complexity, and an increase in cost of refrigeration cycle device 200.

Tenth Embodiment

<Configuration of Refrigeration Cycle Device>

Figure 30:
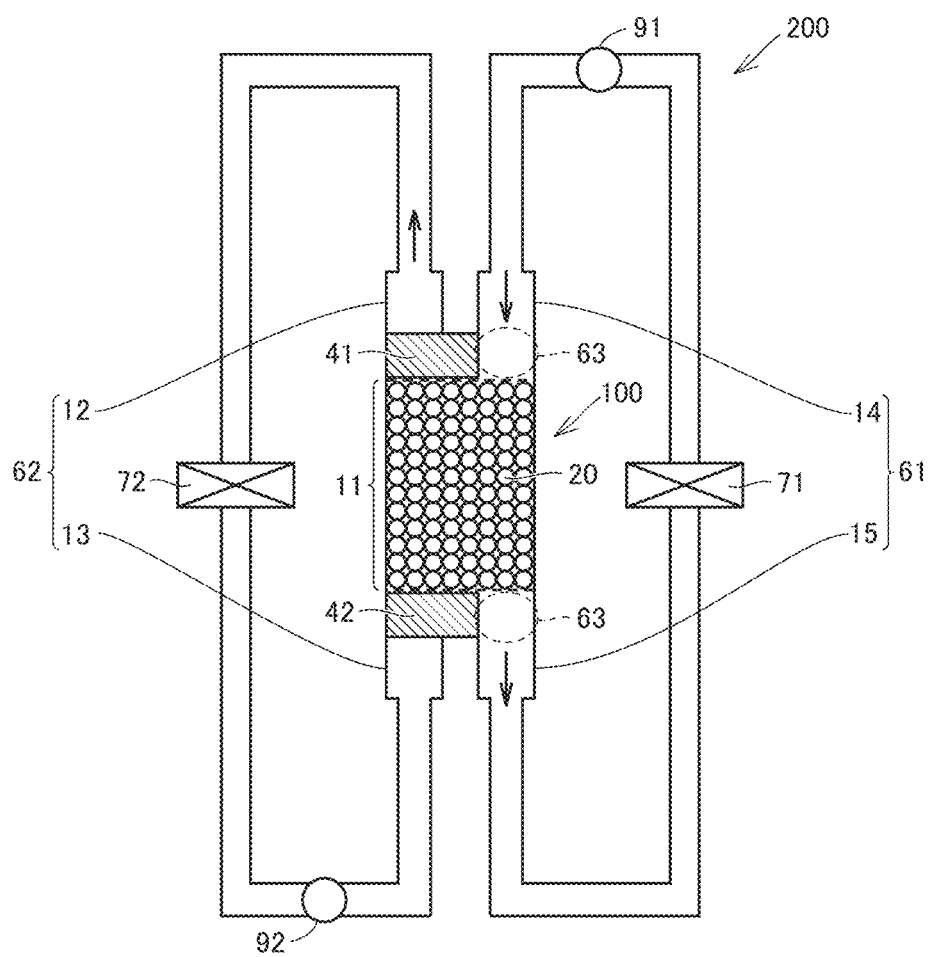
FIG. 30 is a schematic diagram illustrating a refrigeration cycle device according to a tenth embodiment.
Figure 31:
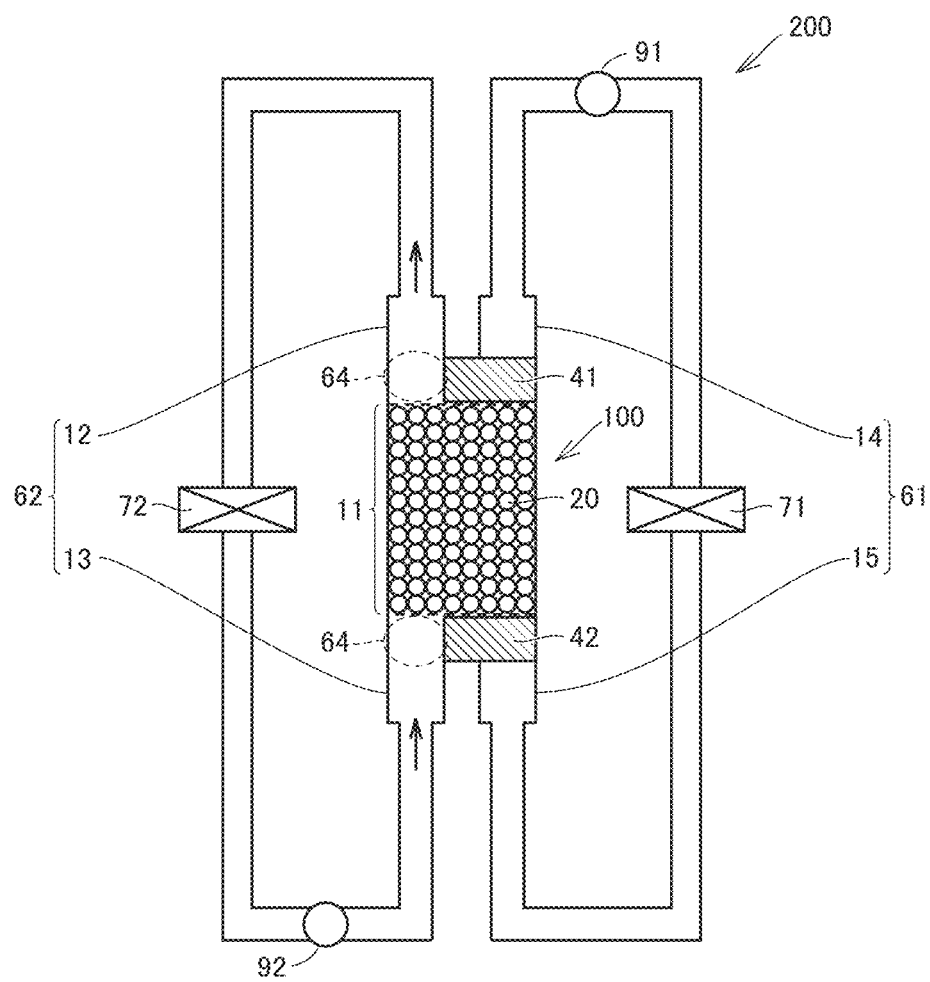
FIG. 31 is a schematic diagram illustrating a refrigeration cycle device according to the tenth embodiment.

FIGS. 30 and 31 are schematic diagrams illustrating a refrigeration cycle device according to a tenth embodiment. FIG. 30 illustrates a case where magnetic refrigeration device 100 that is a part of refrigeration cycle device 200 is in the first state. FIG. 31 illustrates a case where magnetic refrigeration device 100 that is a part of refrigeration cycle device 200 is in the second state. Note that magnetic field generating unit 30 is not illustrated in FIGS. 30 and 31.

Refrigeration cycle device 200 illustrated in FIGS. 30 and 31 mainly includes magnetic refrigeration device 100 described above, first heat exchanger 71, second heat exchanger 72, and pumps 91, 92. First heat exchanger 71 is a high-temperature heat exchanger. Second heat exchanger 72 is a low-temperature heat exchanger. In magnetic refrigeration device 100, first piping 61 includes first piping part 14 and second piping part 15. First piping part 14 supplies the refrigerant to magnetocaloric material 20. Second piping part 15 extracts, from magnetocaloric material 20, the refrigerant thus supplied. First heat exchanger 71 is connected to second piping part 15 and first piping part 14. As illustrated in FIG. 30, first piping part 14, magnetocaloric material 20, second piping part 15, first heat exchanger 71, and pump 91 constitute a first closed loop through which the refrigerant flows in this order.

Second piping 62 includes third piping part 13 and fourth piping part 12. As illustrated in FIG. 31, third piping part 13 supplies the refrigerant to magnetocaloric material 20. Fourth piping part 12 extracts, from magnetocaloric material 20, the refrigerant thus supplied. Second heat exchanger 72 is connected to fourth piping part 12 and third piping part 13. As illustrated in FIG. 31, third piping part 13, magnetocaloric material 20, fourth piping part 12, second heat exchanger 72, and pump 92 constitute a second closed loop through which the refrigerant flows in this order. In FIG. 30, magnetic refrigeration device 100 is in the first state illustrated in FIG. 10 and the like, and a magnetic field is applied to magnetocaloric material 20 from the magnetic field generating unit (not illustrated). In FIG. 31, magnetic refrigeration device 100 is in the second state illustrated in FIG. 11 and the like, and no magnetic field is applied to magnetocaloric material 20. Note that as the configuration of magnetic refrigeration device 100 illustrated in FIGS. 30 and 31, the configuration of magnetic refrigeration device 100 according to any one of the first to eighth embodiments may be employed.

<Operation of Refrigeration Cycle Device>

As illustrated in FIG. 30, in the first state, the refrigerant is heated by magnetocaloric material 20. The refrigerant thus heated is transferred to first heat exchanger 71 through second piping part 15. In first heat exchanger 71, the heat is released from the refrigerant to the outside of first heat exchanger 71. That is, first heat exchanger 71 heats an external medium. Further, the temperature of the refrigerant decreases in first heat exchanger 71. The refrigerant whose temperature has decreased in first heat exchanger 71 is supplied to magnetocaloric material 20 through first piping part 14 by pump 91. That is, when magnetic refrigeration device 100 is in the first state illustrated in FIG. 30, the refrigerant circulates through the first closed loop.

In the second state illustrated in FIG. 31, magnetocaloric material 20 absorbs heat as the magnetic field disappears, so that the refrigerant is cooled by magnetocaloric material 20. The refrigerant thus cooled is transferred from fourth piping part 12 to second heat exchanger 72. In second heat exchanger 72, the refrigerant absorbs heat from the outside of second heat exchanger 72. That is, second heat exchanger 72 cools the external medium. Further, the temperature of the refrigerant increases in second heat exchanger 72. The refrigerant discharged from second heat exchanger 72 is supplied to magnetocaloric material 20 through third piping part 13 by pump 92. That is, when magnetic refrigeration device 100 is in the second state illustrated in FIG. 31, the refrigerant circulates through the second closed loop.

<Actions and Effects>

Refrigeration cycle device 200 according to the present disclosure includes magnetic refrigeration device 100 described above, first heat exchanger 71, and second heat exchanger 72. In magnetic refrigeration device 100, first piping 61 includes first piping part 14 and second piping part 15. First piping part 14 supplies the refrigerant to magnetocaloric material 20. Second piping part 15 extracts, from magnetocaloric material 20, the refrigerant thus supplied. Second piping 62 includes third piping part 13 and fourth piping part 12. Third piping part 13 supplies the refrigerant to magnetocaloric material 20. Fourth piping part 12 extracts, from magnetocaloric material 20, the refrigerant thus supplied. First heat exchanger 71 is connected to second piping part 15. First heat exchanger 71 is connected to first piping part 14. Second heat exchanger 72 is connected to fourth piping part 12. Second heat exchanger 72 is connected to third piping part 13. Refrigeration cycle device 200 described above has the first closed loop in which first piping part 14, magnetocaloric material 20, second piping part 15, and first heat exchanger 71 are connected. Refrigeration cycle device 200 further has the second closed loop in which third piping part 13, magnetocaloric material 20, fourth piping part 12, and second heat exchanger 72 are connected.

Refrigeration cycle device 200 having such a configuration can produce basically the same effect as the effect produced by refrigeration cycle device 200 illustrated in FIGS. 28 and 29.

It should be understood that the embodiments disclosed herein are illustrative in all respects and not restrictive. At least two of the embodiments disclosed herein may be combined as long as there is no inconsistency. The scope of the present disclosure is defined by the claims rather than the above description, and the present disclosure is intended to include the claims, equivalents of the claims, and all modifications within the scope.

REFERENCE SIGNS LIST

11: housing, 12: fourth piping part, 13: third piping part, 14: first piping part, 15: second piping part, 20: magnetocaloric material, 30: magnetic field generating unit, 31: first magnetic field generating member, 31a: first part, 31b: second part, 32: second magnetic field generating member, 33: position changing member, 34, 35: electromagnet, 36: support member, 40: switching unit, 41, 42: valve member, 41a, 42a: magnetic body, 41b, 42b: main body, 43: moving member, 51, 55, 56, 57, 81, 82, 83, 84: arrow, 61: first piping, 62: second piping, 63: first connection part, 64: second connection part, 71: first heat exchanger, 72: second heat exchanger, 91, 92: pump, 100: magnetic refrigeration device, 200: refrigeration cycle device

The invention claimed is:

1. A magnetic refrigeration device comprising:
   a magnetocaloric material;
   first piping to supply a refrigerant to the magnetocaloric material in a first refrigerant direction;
   second piping to supply the refrigerant to the magnetocaloric material in a second refrigerant direction different from the first refrigerant direction;
   a magnetic field generating unit capable of applying a magnetic field to the magnetocaloric material, the magnetic field generating unit including a first magnetic field generating member including a first permanent magnet or a first electromagnet; and
   a switching unit including a valve member to switch between a first state where the refrigerant is supplied from the first piping to the magnetocaloric material and a second state where the refrigerant is supplied from the second piping to the magnetocaloric material in response to the magnetic field generated by the magnetic field generating unit,
   wherein the first magnetic field generating member applies, in the first state, the magnetic field to the magnetocaloric material with the first magnetic field generating member placed at a first position adjacent to the magnetocaloric material,
   the first piping is connected via a first connection part adjacent to the magnetocaloric material,
   the second piping is connected via a second connection part adjacent to the magnetocaloric material,
   the first connection part and the second connection part are arranged in a line in a first direction in which the magnetocaloric material and the first magnetic field generating member are aligned in the first state,
   the valve member is provided in the first connection part and the second connection part, the valve member is movable between the first connection part and the second connection part so as to close the second connection part in the first state and to close the first connection part in the second state, and the valve member includes a magnetic body.

2. The magnetic refrigeration device according to claim 1, wherein the switching unit includes a moving member to move the valve member from the second connection part toward the first connection part.

3. The magnetic refrigeration device according to claim 1, wherein the first direction is a vertical direction.

4. The magnetic refrigeration device according to claim 1, wherein
a second position is remote from the magnetocaloric material relative to the first position in a second direction intersecting the first direction,
the first magnetic field generating member includes a first part to face the magnetocaloric material when placed at the first position and a second part to face the valve member when placed at the first position, and
the first part is different in length in the second direction from the second part.

5. The magnetic refrigeration device according to claim 1, wherein
a second position is remote from the magnetocaloric material relative to the first position in a second direction intersecting the first direction,
the first magnetic field generating member includes a first part to face the magnetocaloric material when placed at the first position and a second part to face the valve member when placed at the first position,
the valve member holds the magnetic body inside and includes a main body made of a non-magnetic material, and
the main body is longer in length in the second direction than the magnetic body.

6. The magnetic refrigeration device according to claim 1, wherein the magnetic body contains a material identical to the magnetocaloric material.

7. The magnetic refrigeration device according to claim 1, wherein the magnetic field generating unit includes a second magnetic field generating member to face, in the first state, the first magnetic field generating member with the magnetocaloric material interposed between the second magnetic field generating member and the first magnetic field generating member, the second magnetic field generating member including a second permanent magnet or a second electromagnet.

8. The magnetic refrigeration device according to claim 7, wherein the first magnetic field generating member is larger in size than the second magnetic field generating member as viewed in the first direction.

9. The magnetic refrigeration device according to claim 1, wherein the first magnetic field generating member includes the first electromagnet.

10. The magnetic refrigeration device according to claim 9, wherein the valve member is moved in accordance with how a current flows through the electromagnet.

11. The magnetic refrigeration device according to claim 10, wherein when a direction in which the current flows through the electromagnet in the first state is defined as a first current direction, the current flows through the electromagnet in a direction opposite to the first current direction upon switching from the first state to the second state.

12. The magnetic refrigeration device according to claim 1, wherein
the magnetic field generating unit includes a second magnetic field generating member, the second magnetic field generating member includes a second permanent magnet or a second electromagnet,
the first magnetic field generating member applies, in the first state, the magnetic field to the magnetocaloric material with the first magnetic field generating member placed at the first position adjacent to the magnetocaloric material,
the second magnetic field generating member faces, in the first state, the first magnetic field generating member with the magnetocaloric material interposed between the second magnetic field generating member and the first magnetic field generating member,
the first piping is connected to the magnetocaloric material at a first connection part,
the second piping is connected to the magnetocaloric material at a second connection part,
the first connection part and the second connection part are arranged in a line in a direction intersecting a first direction in which the magnetocaloric material and the first magnetic field generating member are aligned in the first state,
the first magnetic field generating member and the second magnetic field generating member forms, in the first state, the magnetic field so as to make magnetic flux density at the second connection part larger than magnetic flux density at the first connection part,
the valve member is movable between the first connection part and the second connection part so as to close the second connection part in the first state and to close the first connection part in the second state, and
the valve member includes a magnetic body.

13. The magnetic refrigeration device according to claim 1, wherein the first magnetic field generating member includes the first permanent magnet.

14. A refrigeration cycle device comprising:
a magnetic refrigeration device according to claim 1;
a first heat exchanger; and
a second heat exchanger, wherein
in the magnetic refrigeration device,
the first piping includes a first piping part to supply the refrigerant to the magnetocaloric material and a second piping part to extract, from the magnetocaloric material, the refrigerant supplied,
the second piping includes a third piping part to supply the refrigerant to the magnetocaloric material and a fourth piping part to extract, from the magnetocaloric material, the refrigerant supplied,
the first heat exchanger is connected to the second piping part, and
the second heat exchanger is connected to the fourth piping part.

15. A magnetic refrigeration device comprising:
a magnetocaloric material;
first piping to supply a refrigerant to the magnetocaloric material in a first refrigerant direction;
second piping to supply the refrigerant to the magnetocaloric material in a second refrigerant direction different from the first refrigerant direction;
a magnetic field generating unit capable of applying a magnetic field to the magnetocaloric material, the magnetic field generating unit including a first magnetic field generating member including a first permanent magnet or a first electromagnet;
a switching unit including a valve member to switch between a first state where the refrigerant is supplied from the first piping to the magnetocaloric material and a second state where the refrigerant is supplied from the second piping to the magnetocaloric material in response to the magnetic field generated by the magnetic field generating unit; and the valve member includes a magnetic body containing a material identical to the magnetocaloric material.

16. A magnetic refrigeration device comprising:

a magnetocaloric material;

first piping to supply a refrigerant to the magnetocaloric material in a first refrigerant direction;

second piping to supply the refrigerant to the magnetocaloric material in a second refrigerant direction different from the first refrigerant direction;

a magnetic field generating unit capable of applying a magnetic field to the magnetocaloric material, the magnetic field generating unit including a first magnetic field generating member including a first permanent magnet or a first electromagnet;

a switching unit including a valve member to switch between a first state where the refrigerant is supplied from the first piping to the magnetocaloric material and a second state where the refrigerant is supplied from the second piping to the magnetocaloric material in response to the magnetic field generated by the magnetic field generating unit;

and a position changing member to move the first magnetic field generating member, wherein the first magnetic field generating member applies, in the first state, the magnetic field to the magnetocaloric material with the first magnetic field generating member placed at a first position adjacent to the magnetocaloric material, the first piping is connected to the magnetocaloric material at a first connection part, the second piping is connected to the magnetocaloric material at a second connection part, the first connection part and the second connection part are arranged in a line in a first direction in which the magnetocaloric material and the first magnetic field generating member are aligned in the first state, the valve member is movable between the first connection part and the second connection part so as to close the second connection part in the first state and to close the first connection part in the second state, the valve member includes a magnetic body, a second position is remote from the magnetocaloric material relative to the first position in a second direction intersecting the first direction, the first magnetic field generating member includes a first part to face the magnetocaloric material when placed at the first position and a second part to face the valve member when placed at the first position, the valve member holds the magnetic body inside and includes a main body made of a non-magnetic material, and the main body is longer in length in the second direction than the magnetic body.

* * * * *